United States Patent
Lee et al.

(10) Patent No.: US 11,347,335 B2
(45) Date of Patent: May 31, 2022

(54) TOUCH APPARATUS AND TOUCH DETECTION METHOD FOR DETECTING TOUCH POSITION BY STYLUS PEN

(71) Applicant: HiDeep Inc., Seongnam-si (KR)

(72) Inventors: Hwanhee Lee, Seongnam-si (KR); Seyeob Kim, Seongnam-si (KR); Bonkee Kim, Seongnam-si (KR); Hyoungwook Woo, Seongnam-si (KR); Kiryoung Jung, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 64 days.

(21) Appl. No.: 16/844,033

(22) Filed: Apr. 9, 2020

(65) Prior Publication Data
US 2020/0326805 A1    Oct. 15, 2020

(30) Foreign Application Priority Data
Apr. 10, 2019    (KR) .................. 10-2019-0042054

(51) Int. Cl.
*G06F 3/041* (2006.01)
*G06F 3/044* (2006.01)
(Continued)

(52) U.S. Cl.
CPC ........ *G06F 3/0412* (2013.01); *G06F 3/03545* (2013.01); *G06F 3/046* (2013.01);
(Continued)

(58) Field of Classification Search
CPC .......... G06F 3/0412; G06F 3/046; G06F 3/14; G06F 3/0441; G06F 3/04166;
(Continued)

(56) References Cited

U.S. PATENT DOCUMENTS

2006/0012581 A1*  1/2006  Haim ................ G06F 3/041661
                                                          345/173
2013/0207925 A1*  8/2013  Ryshtun ............. G06F 3/04166
                                                          345/174
(Continued)

FOREIGN PATENT DOCUMENTS

KR    10-2013-0127033    11/2013
KR    10-2016-0025440    3/2016
(Continued)

OTHER PUBLICATIONS

KIPO, ISA/210 of Application No. PCT/KR2020/004843, dated Jul. 20, 2020.
(Continued)

*Primary Examiner* — Adam J Snyder
(74) *Attorney, Agent, or Firm* — Lex IP Meister, PLLC

(57) ABSTRACT

A touch device includes: a touch panel including a plurality of touch electrodes; a driver/receiver for applying a first driving signal to the touch panel while driven in a first mode, and applying a second driving signal that is different from the first driving signal to the touch panel while driven in a second mode; and a controller for comparing first detection signals received from the touch panel with a first threshold value to obtain first touch data while driven in the first mode, and comparing second detection signals received from the touch panel with a second threshold value to obtain second touch data while driven in the second mode, wherein the controller determines the second threshold value based on at least part of the first detection signals.

24 Claims, 20 Drawing Sheets

(51) Int. Cl.
*G06F 3/0354* (2013.01)
*G06F 3/046* (2006.01)
*G06F 3/14* (2006.01)

(52) U.S. Cl.
CPC .......... *G06F 3/0416* (2013.01); *G06F 3/0441* (2019.05); *G06F 3/04166* (2019.05); *G06F 3/14* (2013.01); *G06F 2203/04104* (2013.01); *G06F 2203/04111* (2013.01); *G06F 2203/04114* (2019.05)

(58) Field of Classification Search
CPC ......... G06F 3/0416; G06F 2203/04104; G06F 2203/04111; G06F 2203/04114; G06F 3/03545
See application file for complete search history.

(56) References Cited

U.S. PATENT DOCUMENTS

| | | | | |
|---|---|---|---|---|
| 2013/0300708 A1* | 11/2013 | Kim | ................ | G06F 3/04166 345/174 |
| 2014/0210780 A1* | 7/2014 | Lee | ................ | G06F 3/0445 345/174 |
| 2014/0354583 A1* | 12/2014 | Tokutake | ............ | G06F 3/04166 345/174 |
| 2015/0248178 A1* | 9/2015 | Oh | ................ | G06F 3/04166 345/174 |
| 2015/0346875 A1* | 12/2015 | Yeh | ................ | G06F 3/04162 345/174 |
| 2016/0062519 A1* | 3/2016 | Park | ................ | G06F 3/04166 345/173 |
| 2016/0259442 A1 | 9/2016 | Ukai | | |
| 2017/0123568 A1* | 5/2017 | Takeda | ............... | G06F 3/04166 |

FOREIGN PATENT DOCUMENTS

KR  10-2016-0067095   6/2016
KR  10-2017-0081128   7/2017

OTHER PUBLICATIONS

KIPO, ISA/237 of Application No. PCT/KR2020/004843, dated Jul. 20, 2020.

* cited by examiner

TOUCH APPARATUS AND TOUCH DETECTION METHOD FOR DETECTING TOUCH POSITION BY STYLUS PEN

CROSS-REFERENCE TO RELATED APPLICATION

This application claims priority to and the benefit of Korean Patent Application No. 10-2019-0042054 filed in the Korean Intellectual Property Office on Apr. 10, 2019, the entire contents of which are incorporated herein by reference.

BACKGROUND

(a) Field

The present disclosure relates to a touch device and a touch detecting method thereof.

(b) Description of the Related Art

A touch sensor is installed in various terminals such as a mobile phone, a smart phone, a tablet PC, a laptop computer, a digital broadcasting terminal, a personal digital assistant (PDA), a portable multimedia player (PMP), or a global positioning system (GPS).

In the terminal, a touch sensor may be provided on a display panel for displaying images, or it may be provided in one area of the terminal body. A user interacts with the terminal by touching a touch sensor, so the terminal may provide an intuitive user interface to the user.

The user may use a stylus pen for a precise touch input. The stylus pen may transmit and receive signals through an electrical and/or magnetic method with the touch sensor.

In the case of a passive stylus pen, the stylus pen generates a signal by resonating with the driving signal applied to the touch sensor, and the touch sensor detects a touch position by receiving a resonant signal of the stylus pen. In another way, when the passive stylus pen simultaneously touches a conductive object such as a human body and the touch sensor, the touch sensor may fail to sense a touch of the stylus pen depending on a position of the conductive object or a touch area of the conductive object.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a touch device for sensing a touch position by a stylus pen when a conductive object such as a human body simultaneously contacts the stylus pen, and a touch detecting method thereof.

An exemplary embodiment of the present invention provides a touch device including: a touch panel including a plurality of touch electrodes; a driver/receiver for applying a first driving signal to the touch panel while driven in a first mode, and applying a second driving signal that is different from the first driving signal to the touch panel while driven in a second mode; and a controller for comparing first detection signals received from the touch panel with a first threshold value to obtain first touch data while driven in the first mode, and comparing second detection signals received from the touch panel with a second threshold value to obtain second touch data while driven in the second mode, wherein the controller may determine the second threshold value based on at least part of the first detection signals.

The controller may obtain touch coordinates by using the second detection signals, and may determine the second threshold value by using first detection signals corresponding to a predetermined area selected based on the touch coordinates among the first detection signals.

The plurality of touch electrodes may include a plurality of first touch electrodes arranged in a first direction and a plurality of second touch electrodes arranged in a second direction crossing the first direction, and the driver/receiver may apply a signal at a first frequency as the first driving signal to the first touch electrodes during a first period driven in the first mode.

The driver/receiver may apply a signal at a second frequency that is different from the first frequency as the second driving signal to the first touch electrodes and the second touch electrodes during a part of a second period driven in the second mode.

The controller may receive the first detection signals from the second touch electrodes for the first period.

The controller may receive the second detection signals from the first touch electrodes and the second touch electrodes during a part of the second period.

A frequency of the second driving signal may correspond to a resonant frequency of a stylus pen.

The first detection signals may be used in obtaining touch coordinates of a first touch object, while the second detection signals may be used in obtaining touch coordinates of a second touch object, and the second touch object may include a stylus pen, and the first touch object may include a conductive touch object that is different from the stylus pen.

The controller, when the first and second touch objects simultaneously touch the touch panel, may obtain the second touch data caused by the second touch object by changing the second threshold value according to a distance between a touch point of the first touch object and a touch point of the second touch object.

The controller, when the first and second touch objects simultaneously touch the touch panel, may obtain the second touch data caused by the second touch object by changing the second threshold value according to a touch pattern of the first touch object.

The touch pattern may include a touch area or a touch shape.

Another embodiment of the present invention provides a touch device including: a touch panel; a driver/receiver for applying a driving signal corresponding to a frequency of a resonant signal of a stylus pen to a touch panel, and receiving detection signals from the touch panel; and a controller for obtaining touch data caused by the stylus pen by using at least one detection signal identified as a valid touch signal from among the detection signals. The controller may identify a detection signal having a signal size in a first range as the valid touch signal when the touch panel is touched by the stylus pen alone. The controller may identify a detection signal having a signal size in a second range that is different from the first range as the valid touch signal when the touch panel is concurrently touched by the stylus pen and a conductive touch object that is different from the stylus pen.

The controller may identify the valid touch signal by comparing the detection signals and a threshold value. The threshold value when the touch panel is touched by the stylus pen alone is different from the threshold value when the touch panel is concurrently touched by the stylus pen and a conductive touch object that is different from the stylus pen.

When the touch panel is concurrently touched by the stylus pen and a conductive touch object that is different from the stylus pen, the controller may amplify detection signals having a signal size in the second range so that they have a signal size in the first range, and then may identify the valid touch signal by comparing the amplified detection signals and a threshold value.

Yet another embodiment of the present invention provides a method for a touch device to detect a touch including: applying a driving signal corresponding to a resonant signal of a stylus pen to the touch panel when a touch panel is touched by the stylus pen alone; receiving detection signals from the touch panel; identifying a valid touch signal from among the detection signals by using a threshold value; and obtaining touch data caused by the stylus pen by using the detection signal identified as the valid touch signal from among the detection signals, wherein the identifying includes identifying a detection signal having a signal size in a first range from among the detection signals as the valid touch signal when the touch panel is touched by the stylus pen alone, and identifying a detection signal having a signal size in a second range that is different from the first range from among the detection signals as the valid touch signal when the touch panel is concurrently touched by the stylus pen and a conductive touch object that is different from the stylus pen.

The threshold value when the touch panel is touched by the stylus pen alone may be different from the threshold value when the touch panel is concurrently touched by the stylus pen and a conductive touch object that is different from the stylus pen.

The identifying of a detection signal having a signal size in the second range as the valid touch signal may include: amplifying the detection signals so that the detection signal having a signal size in the second range from among the detection signals may have a signal size in the first range; and identifying the valid touch signal by comparing the amplified detection signals and the threshold value.

Yet another embodiment of the present invention provides a method for a touch device to detect a touch including: entering a first mode, and applying a first driving signal to a touch panel; receiving first detection signals from the touch panel corresponding to the first driving signal; obtaining first touch data by comparing the first detection signals and a first threshold value; entering a second mode, and applying a second driving signal that is different from the first driving signal to the touch panel; receiving second detection signals from the touch panel corresponding to the second driving signal; determining a second threshold value based on the first detection signals; and obtaining second touch data by comparing the second detection signals and the second threshold value.

The determining may include: obtaining touch coordinates by using the second detection signals; and determining the second threshold value by using first detection signals corresponding to a predetermined area selected based on the touch coordinates from among the first detection signals.

The determining may include using one of a first value and a second value obtained by using the first detection signals as the second threshold value.

The second value may be less than the first value.

The method may further include: obtaining touch coordinates of a first touch object by using the first touch data; and obtaining touch coordinates of a second touch object by using the second touch data. The second touch object may include a stylus pen, and the first touch object may include a conductive touch object that is different from the stylus pen.

The determining may include changing the second threshold value according to a distance between a touch point of the first touch object and a touch point of the second touch object when the first and second touch objects simultaneously touch the touch panel.

The determining may include changing the second threshold value according to a touch pattern of the first touch object when the first and second touch objects simultaneously touch the touch panel.

According to the exemplary embodiments, when the conductive object such as a human body and the stylus pen simultaneously contact, the touch position by the stylus pen may be detected as a merit.

DETAILED DESCRIPTION OF THE EMBODIMENTS

Figure 1:
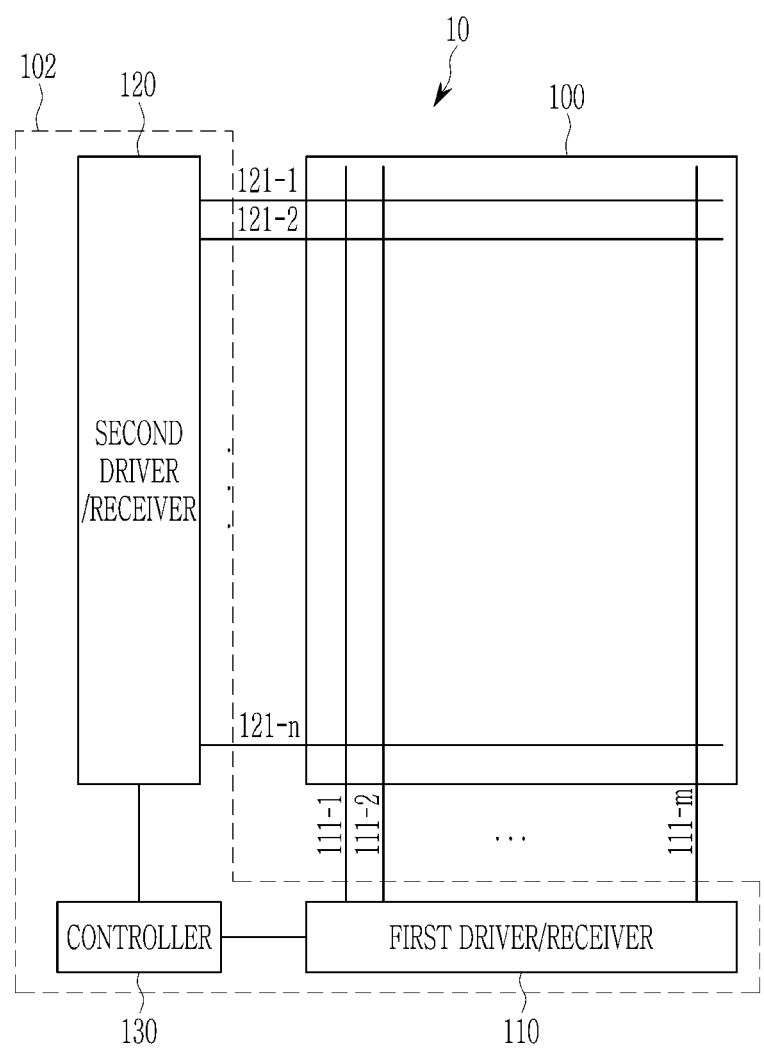
FIG. 1 shows a touch device according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Terms including ordinal numbers such as first, second, and the like, will be used only to describe various components, and are not to be interpreted as limiting these components. The terms are only used to differentiate one component from other components. For example, a first constituent element could be termed a second constituent element, and similarly, a second constituent element could be termed a first constituent element, without departing from the scope of the present invention.

Further, the size and thickness of each configuration shown in the drawings are arbitrarily shown for better understanding and ease of description, and the present invention is not limited thereto. In the drawings, the thickness of layers, films, panels, regions, etc., are exaggerated for clarity. For better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, the word "on" or "above" means positioned on or below the object portion, and does not necessarily mean positioned on the upper side of the object portion based on a gravitational direction.

Unless explicitly described to the contrary, the word "comprise" and variations such as "comprises" or "comprising" will be understood to imply the inclusion of stated elements but not the exclusion of any other elements.

A touch device and a touch detecting method thereof according to exemplary embodiments will now be described with reference to accompanying drawings.

Figure 2:
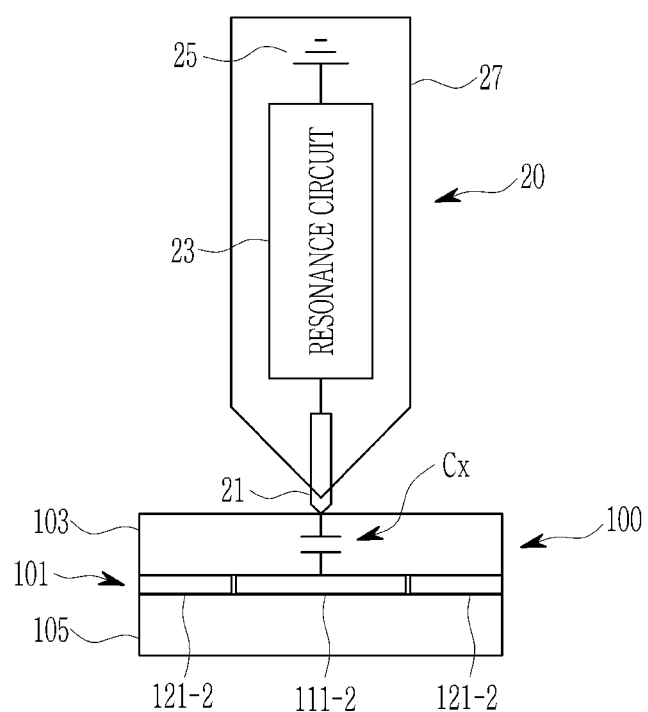
FIG. 2 shows an example in which a stylus pen touches a touch device according to an exemplary embodiment.

FIG. 1 shows a touch device according to an exemplary embodiment, and FIG. 2 shows an example in which a stylus pen touches a touch device according to an exemplary embodiment.

Referring to FIG. 1, the touch device 10 includes a touch panel 100, and a touch controller 102 for controlling the touch panel 100. The touch controller 102 may include the touch panel 100, first and second drivers/receivers 110 and 120 for transmitting and receiving signals, and a controller 130.

The touch panel 100 includes a plurality of first touch electrodes (111-1 to 111-*m*) extending in a first direction, and a plurality of second touch electrodes (121-1 to 121-*n*) extending in a second direction crossing the first direction. On the touch panel 100, a plurality of first touch electrodes (111-1 to 111-*m*) may be arranged in the second direction, and a plurality of second touch electrodes (121-1 to 121-*n*) may be arranged in the first direction. In FIG. 1, the touch panel 100 is shown to be quadrangular, and it is not limited thereto.

As shown in FIG. 2, the touch panel 100 may include a substrate 105 and a window 103. A plurality of first touch electrodes (111-1 to 111-*m*) and a plurality of second touch electrodes (121-1 to 121-*n*) may be positioned on the substrate 105. The window 103 may be positioned on a plurality of first touch electrodes (111-1 to 111-*m*) and a plurality of second touch electrodes (121-1 to 121-*n*). A plurality of first touch electrodes (111-1 to 111-*m*) and a plurality of second touch electrodes (121-1 to 121-*n*) are illustrated to be positioned on a same layer in FIG. 2, and they may also be positioned on different layers, but they are not limited thereto.

A plurality of first touch electrodes (111-1 to 111-*m*) are connected to the first driver/receiver 110, and a plurality of second touch electrodes (121-1 to 121-*n*) are connected to the second driver/receiver 120. The first driver/receiver 110 is illustrated to be separated from the second driver/receiver 120 in FIG. 1, and the first driver/receiver 110 and the second driver/receiver 120 may be realized as a module, a unit, or a chip, but they are not limited thereto.

The first driver/receiver 110 may apply a driving signal to a plurality of first touch electrodes (111-1 to 111-*m*) through a plurality of touch channels. The first driver/receiver 110 may receive a detection signal from a plurality of first touch electrodes (111-1 to 111-*m*) through a plurality of touch channels. In a like manner, the second driver/receiver 120 may apply a driving signal to a plurality of second touch electrodes (121-1 to 121-*n*) through a plurality of touch channels. The second driver/receiver 120 may receive a detection signal from a plurality of first touch electrodes (121-1 to 121-*n*) through a plurality of touch channels. That is, the first driver/receiver 110 and the second driver/receiver 120 may be transceivers for transmitting and receiving signals.

When the driving signal is applied to a plurality of first touch electrodes (111-1 to 111-*m*) from the first driver/receiver 110, touch channels corresponding to a plurality of first touch electrodes (111-1 to 111-*m*) are operated as driving channels. When the detection signal is applied to first driver/receiver 110 from a plurality of first touch electrodes (111-1 to 111-*m*), touch channels corresponding to a plurality of first touch electrodes (111-1 to 111-*m*) are operated as sensing channels. In a like manner, when the driving signal is applied to a plurality of second touch electrodes (121-1 to 121-*n*) from the second driver/receiver 110, touch channels corresponding to a plurality of second touch electrodes (121-1 to 121-*n*) are operated as driving channels. When the detection signal is applied to the second driver/receiver 120 from a plurality of second touch electrodes (121-1 to 121-*n*), touch channels corresponding to a plurality of second touch electrodes (121-1 to 121-*n*) are operable as sensing channels.

The driving signal may include a signal (e.g., a sine wave, a square wave, etc.) having a frequency corresponding to a resonant frequency of the stylus pen 20. The resonant frequency of the stylus pen 20 follows design values of a resonance circuit 23 of the stylus pen.

The touch device 10 may be used to sense a touch input (a direct touch or an adjacent touch) by a touch object. As shown in FIG. 2, a touch input of the stylus pen 20 that is near the touch panel 100 may be sensed by the touch device 10.

The stylus pen 20 may include a conductive tip 21, a resonance circuit 23, a ground 25, and a body 27.

At least part of the conductive tip 21 is made of a conductive material (e.g., a metal, a conductive rubber, a conductive fabric, or a conductive silicon), and it may be electrically connected to the resonance circuit 23.

The resonance circuit 23 is an LC resonant circuit, and it may resonate with the driving signal applied to at least one type of electrode from among a plurality of first touch electrodes (111-1 to 111-*m*) and a plurality of second touch electrodes (121-1 to 121-*n*) from at least one of the first driver/receiver 110 and the second driver/receiver 120 through the conductive tip 21.

The resonant signal generated when the resonance circuit 23 resonates to the driving signal may be output to the touch panel 100 through the conductive tip 21. For a period in which the driving signal is applied to at least one type of electrode from among a plurality of first touch electrodes (111-1 to 111-*m*) and a plurality of second touch electrodes (121-1 to 121-*n*) of the touch panel 100, and a subsequent period, a resonant signal caused by resonance of the resonance circuit 23 may be transmitted to the conductive tip 21. The resonance circuit 23 is positioned in the body 27, and it may be electrically connected to the ground 25.

The above-noted type of stylus pen 20 generates a resonant signal by responding to the driving signal applied to at least one of the touch electrodes (111-1 to 111-*m*, 121-1 to 121-*n*), thereby generating a touch input.

When the touch panel 100 is touched by the stylus pen 20, capacitance (Cx) is formed by at least one of the touch electrodes (111-1 to 111-*m*, 121-1 to 121-*n*) and the conductive tip 21 of the stylus pen 20. Through the capacitance (Cx) between the at least one of touch electrodes (111-1 to 111-*m*, and 121-1 to 121-*n*) and the conductive tip 21, the driving signal may be transmitted to the stylus pen 20 and the resonant signal may be transmitted to the touch panel 100.

The touch device 10 may detect a touch caused by a touch object (e.g., the user's body regions (a finger, a palm, etc.), and a passive or active stylus pen) other than the stylus pen 20 using the method for generating a resonant signal, and it is not limited thereto.

For example, the touch device 10 may detect the touch by the stylus pen for receiving an electrical signal and outputting the same as a magnetic field signal. Further, the touch device 10 may detect the touch caused by the stylus pen for receiving a magnetic field signal and outputting a magnetic field signal resonated by the same.

The touch device 10 may further include a digitizer. In this case, the magnetic field signal that is electromagnetically resonated (or electromagnetically induced) by the stylus pen is detected by a digitizer, so the touch may be detected.

The touch device 10 may further include a coil for applying a current as a driving signal together with the digitizer. In this case, the stylus pen electromagnetically resonates with (or electromagnetically induces) the magnetic field signal generated in the coil to which a current is applied to generate a magnetic field signal, and the magnetic field signal generated by electromagnetically resonance (or electromagnetic induction) by the stylus pen is detected by the digitizer, so the touch may be detected.

The controller 130 may control driving of the touch device 10, and may output touch coordinate information corresponding to a touch sensing result of the touch device 10.

A method for detecting a touch according to an exemplary embodiment will now be described with reference to FIG. 3 and FIG. 4.

Figure 3:
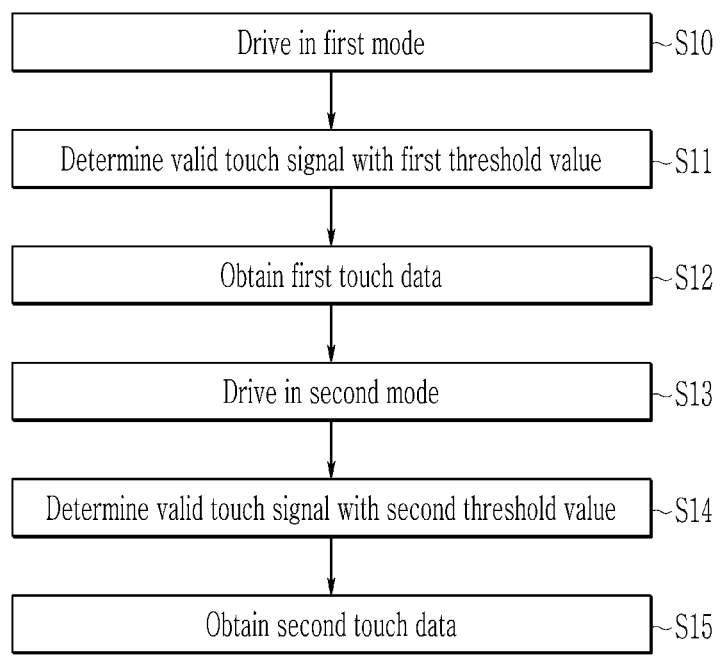
FIG. 3 shows a flowchart of a method for detecting a touch according to an exemplary embodiment.

FIG. 3 shows a flowchart of a method for detecting a touch according to an exemplary embodiment. The method for detecting a touch of FIG. 3 may be performed by the touch device 10 described with reference to FIG. 1 and FIG. 2.

Referring to FIG. 3, the touch device 10 is driven in a first mode (S10). The first mode represents a mode for applying a driving signal for detecting a touch input by a touch object other than the stylus pen 20 to the touch panel 100.

For example, while the touch device 10 is driven in the first mode, the first driver/receiver 110 may output a driving signal to a plurality of first touch electrodes (111-1 to 111-*m*), and the second driver/receiver 120 may receive a detection signal caused by a touch from a plurality of second touch electrodes (121-1 to 121-*n*).

The controller 130 determines whether a detection signal is a valid touch signal based on whether a signal size (signal amplitude or signal intensity) of the detection signal obtained while the touch device 10 is driven in the first mode is greater than a first threshold value (S11), and it obtains first touch data including touch coordinates and a touch area by using the detection signal determined to be a valid touch signal (S12).

For example, when the signal size of the detection signal received while the touch device 10 is driven in the first mode is greater than a first threshold value, the controller 130 uses the detection signal to calculate touch coordinate information of the touch object. On the contrary, when the signal size of the detection signal received while the touch device 10 is driven in the first mode is equal to or less than the first threshold value, the controller 130 excludes the corresponding detection signal from a calculation of the touch coordinates. For example, when the signal size of the detection signal received while the touch device 10 is driven in the first mode is greater than the first threshold value, the controller 130 may calculate the touch area by using the detection signal.

While the touch device 10 is driven in the first mode, the detection signal generated by a touch may include at least one of a first detection signal generated by a touch caused by the user's body region (a finger, a palm, etc.), and a second detection signal generated by a touch caused by the stylus pen 20 or the passive stylus pen. In the stage S11, the first threshold value may be set so that the first detection signal is determined to be a valid touch signal and the second detection signal may be filtered.

When the first mode ends, the touch device 10 is driven in a second mode (S13). The second mode represents a mode for applying a driving signal for detecting a touch input caused by the stylus pen 20 to the touch panel 100, and receiving a resonant signal of the stylus pen 20 resonating in response to the driving signal applied to the touch panel 100.

For example, when the touch device 10 is driven in the second driving mode, the first driver/receiver 110 and the second driver/receiver 120 may apply driving signals to a plurality of first touch electrodes (111-1 to 111-*m*) and a plurality of second touch electrodes (121-1 to 121-*n*). The resonance circuit 23 of the stylus pen 20 resonates by the driving signals applied to a plurality of first touch electrodes (111-1 to 111-*m*) and a plurality of second touch electrodes (121-1 to 121-*n*), and the resonant signal generated by the resonance may be transmitted to the touch panel 100 through the conductive tip 21. Accordingly, the first driver/receiver 110 receives the detection signal from a plurality of first touch electrodes (111-1 to 111-*m*) and the second driver/receiver 120 receives the detection signals from a plurality of second touch electrodes (121-1 to 121-*n*), and the first driver/receiver 110 and the second driver/receiver 120 may process the received detection signals and may transmit resultant signals to the controller 130.

It has been exemplified in the above that the first driver/receiver 110 and the second driver/receiver 120 simultaneously apply driving signals to a plurality of first touch electrodes (111-1 to 111-*m*) and a plurality of second touch electrodes (121-1 to 121-*n*) in order to generate a resonant signal of the stylus pen 20 while the touch device 10 is driven in the second driving mode, and the driving signal may be simultaneously applied to a plurality of first touch electrodes (111-1 to 111-*m*) by the first driver/receiver 110 or the driving signal may be simultaneously applied to a plurality of second touch electrodes (121-1 to 121-*n*) by the second driver/receiver 120. When the first driver/receiver 110 and the second driver/receiver 120 simultaneously apply the driving signals to a plurality of first touch electrodes (111-1 to 111-*m*) and a plurality of second touch electrodes (121-1 to 121-*n*), phases of the driving signals applied to a plurality of first touch electrodes (111-1 to 111-*m*) will be assumed to be equivalent to phases of the driving signals of a plurality of second touch electrodes (121-1 to 121-*n*), and they will not be limited thereto.

The controller 130 determines whether the detection signal is a valid touch signal based on whether the signal size of the detection signal sensed while the touch device 10 is driven in the second mode is greater than a second threshold value (S14), and it obtains second touch data by using the detection signal that is determined to be a valid touch signal (S15).

For example, the controller 130 may calculate touch coordinates by using the detection signal when the signal size of the detection signal obtained while the touch device 10 is driven in the second mode is greater than the second threshold value. On the contrary, the controller 130 excludes the detection signal from the calculation of the touch coordinates when the signal size of the detection signal received while the touch device 10 is driven in the second mode is equal to or less than the second threshold value. The controller 130 may calculate a touch area by using the detection signal when the signal size of the detection signal obtained in the second period is greater than the second threshold value.

A driving signal applied for first and second periods, and a resonant signal of a stylus pen 20, will now be described with reference to FIG. 4.

Figure 4:
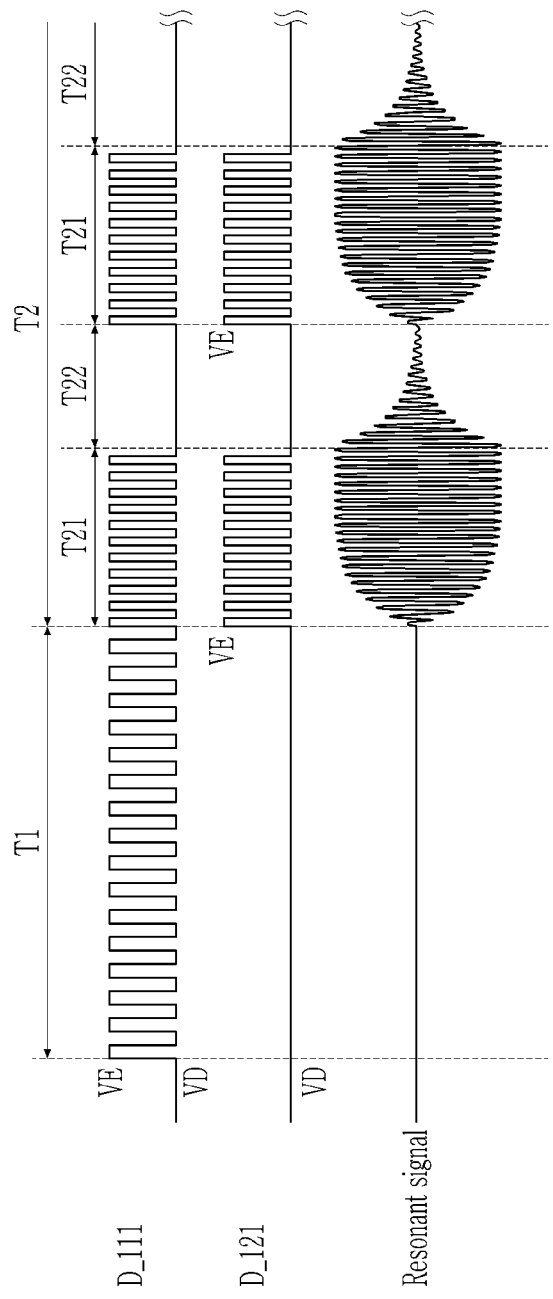
FIG. 4 shows a waveform diagram of an example of a driving signal according to a method for detecting a touch of FIG. 3.

FIG. 4 shows a waveform diagram of an example of a driving signal according to a method for detecting a touch of FIG. 3. Referring to FIG. 4, D_111 and D_121 exemplify driving signals output by the first driver/receiver 110 and the second driver/receiver 120.

Referring to FIG. 4, for the first period T1 in which the touch device 10 is driven in the first mode, the first driver/receiver 110 outputs a driving signal to at least one type of touch electrodes from among a plurality of first touch electrodes (111-1 to 111-*m*) and a plurality of second touch electrodes (121-1 to 121-*n*). When the first driver/receiver 110 outputs a driving signal to a plurality of first touch electrodes (111-1 to 111-*m*), the second driver/receiver 120 may receive detection signals from a plurality of second touch electrodes (121-1 to 121-*n*).

For the first sub-section T21 of the second period T2 in which the touch device 10 is driven in the second mode, the first driver/receiver 110 simultaneously applies a driving signal to a plurality of first touch electrodes (111-1 to 111-*m*), and the second driver/receiver 120 simultaneously applies a driving signal to a plurality of second touch electrodes (121-1 to 121-*n*).

In the first sub-section T21, a frequency of the driving signal applied to a plurality of first touch electrodes (111-1 to 111-*m*) and a plurality of second touch electrodes (121-1 to 121-*n*) corresponds to the resonant frequency of the stylus pen 20. For example, for the first sub-section T21, the frequency of the driving signal output to a plurality of first touch electrodes (111-1 to 111-*m*) and a plurality of second touch electrodes (121-1 to 121-*n*) may be a frequency within an offset of 25 kHz with respect to 500 kHz. On the contrary, in the first period T1, the frequency of the driving signal output to a plurality of first touch electrodes (111-1 to 111-*m*) is set to be different from the resonant frequency of the stylus pen 20. For example, for the first period T1, the frequency of the driving signal output to a plurality of first touch electrodes (111-1 to 111-*m*) may be set to be around 150 kHz. The above-noted setting of the frequency of the driving signal is an example, and it may be set to have a different value.

For the second sub-section T22 of the second period T2 in which the touch device 10 is driven in the second mode, the first driver/receiver 110 receives detection signals from a plurality of first touch electrodes (111-1 to 111-*m*), and the second driver/receiver 120 receives detection signals from a plurality of second touch electrodes (121-1 to 121-*n*). For the second sub-section T22, the resonant signal output by the resonance circuit 23 of the stylus pen 20 may be received by at least one of a plurality of first touch electrodes (111-1 to 111-*m*) and a plurality of second touch electrodes (121-1 to 121-*n*) after applying of the driving signal is finished.

The second period T2 may include a plurality of first sub-sections T21 and second sub-sections T22. For example, in the second period T2, a combination of the first sub-section T21 and the second sub-section T22 may be repeated eight times.

It has been described in the above that the second period T2 is provided after the first period T1 and the first period T1 is provided after the second period T2, and temporal lengths of the first period T1 and the second period T2 may be respectively changed in various frames, and a method for driving the touch device 10 according to an exemplary embodiment is not limited thereto.

Further, it has been described that the first driver/receiver 110 and the second driver/receiver 120 receive detection signals for the second sub-section T22, and the first driver/receiver 110 and the second driver/receiver 120 may receive detection signals through a plurality of first touch electrodes (111-1 to 111-*m*) and a plurality of second touch electrodes (121-1 to 121-*n*) for the first sub-section T21.

Operations of the first and second drivers/receivers 110 and 120 in the touch device 10 shown in FIG. 1 will now be described with reference to FIG. 5 and FIG. 7.

Figure 5:
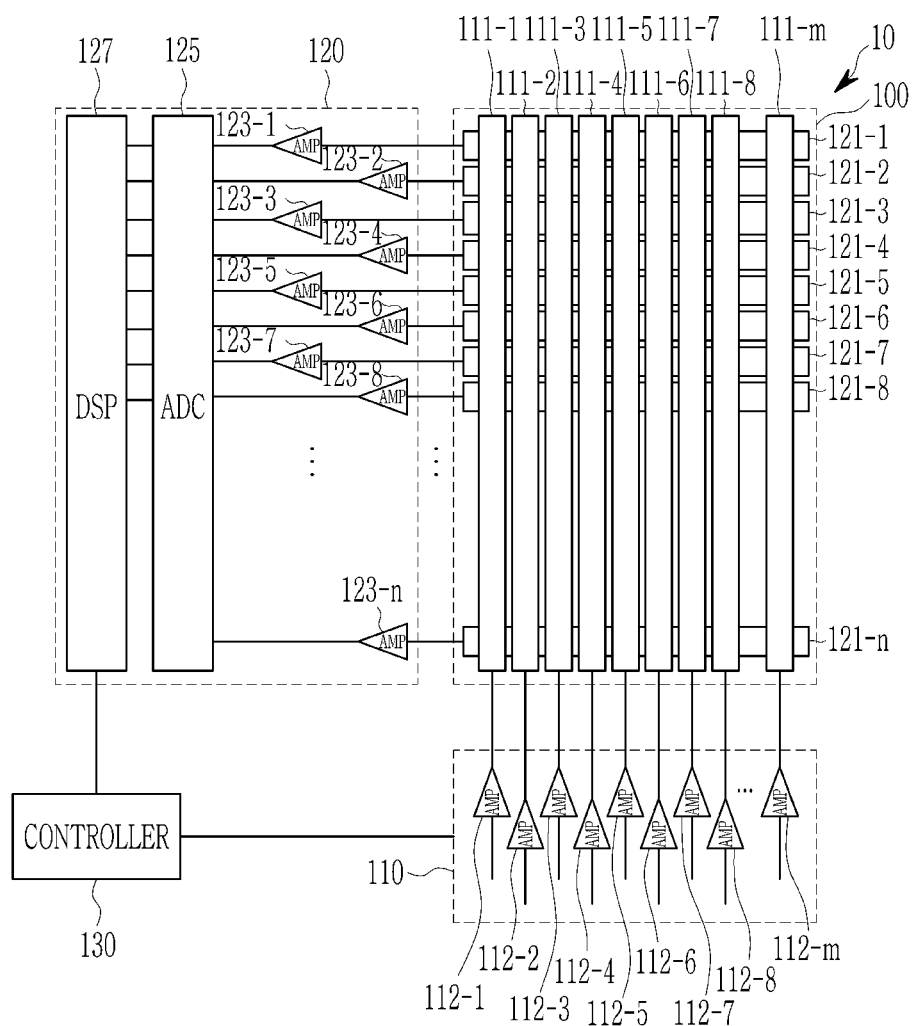
FIG. 5 shows a detailed operation of first and second drivers/receivers in a first period T1 of FIG. 4.
Figure 6:
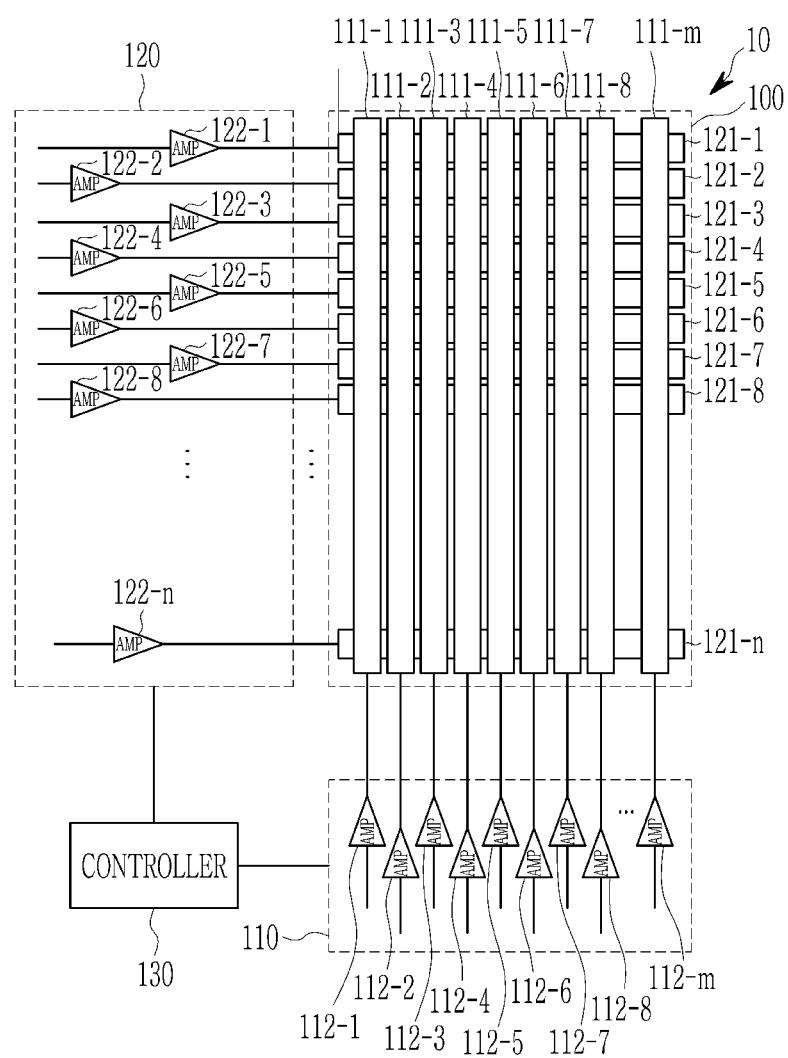
FIG. 6 shows a detailed operation of first and second drivers/receivers in a first sub-section of a second period of FIG. 4.
Figure 7:
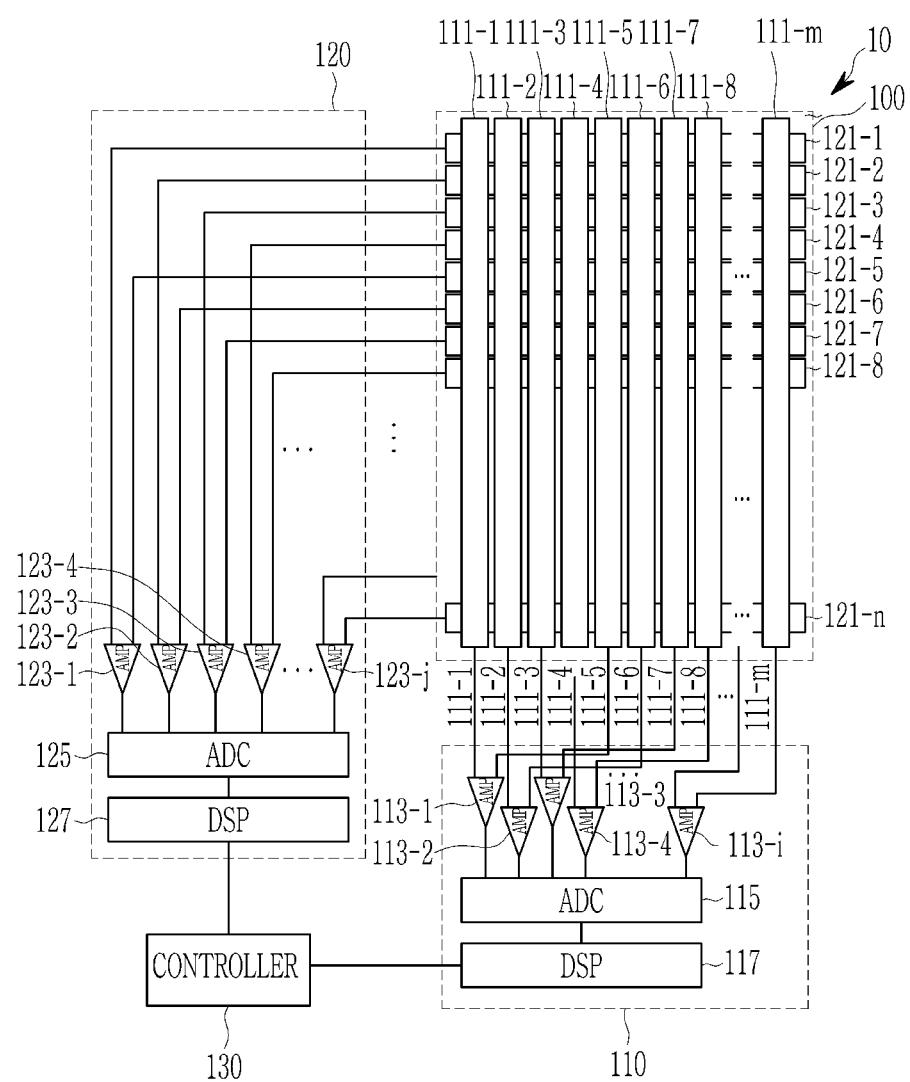
FIG. 7 shows detailed operations of first and second drivers/receivers in a second sub-section of a second period of FIG. 4.

Referring to FIG. 5 to FIG. 7, the first driver/receiver 110 includes a plurality of amplifiers (112-1 to 112-*m*), a plurality of differential amplifiers (or difference amplifiers) (113-1 to 113-*i*), an ADC 115, and a signal processor (DSP, 117).

The second driver/receiver 120 includes a plurality of first amplifiers (122-1 to 122-*n*), a plurality of second amplifiers (123-1 to 123-*j*) (or a plurality of differential amplifiers (or difference amplifiers) (123-1 to 123-*j*)), an ADC 125, and a signal processor (DSP, 127).

FIG. 5 shows detailed operations of the first and second drivers/receivers 110 and 120 in the first period T1 of FIG. 4.

Referring to FIG. 5, a plurality of amplifiers (112-1 to 112-$m$) included in the first driver/receiver 110 are connected to a plurality of first touch electrodes (111-1 to 111-$m$) to output a first driving signal for the first period T1.

For the first period T1, a plurality of second amplifiers (123-1 to 123-$n$) included in the second driver/receiver 120 are connected to one corresponding second touch electrode from among a plurality of second touch electrodes (121-1 to 121-$n$) to receive detection signals. A plurality of second amplifiers (123-1 to 123-$n$) may respectively be realized with an amplifier including one input end connected to a ground or a DC voltage, and another input end for receiving a detection signal of the corresponding second touch electrode. That is, a plurality of second amplifiers (123-1 to 123-$n$) respectively amplify detection signals transmitted from a plurality of second touch electrodes (121-1 to 121-$n$) in a parallel way and output resultant signals.

For the first period T1, the ADC 125 of the second driver/receiver 120 converts the detection signal amplified by a plurality of second amplifiers (123-1 to 123-$n$) into digital signals, and the signal processor 127 processes a plurality of amplified signals that are converted into digital signals by the ADC 125 and transmits resultant signals to the controller 130.

FIG. 6 shows a detailed operation of first and second drivers/receivers 110 and 120 in a first sub-section T21 of a second period T2 of FIG. 4.

Referring to FIG. 6, for the first sub-section T21, a plurality of amplifiers (112-1 to 112-$m$) included in the first driver/receiver 110 are connected to a plurality of first touch electrodes (111-1 to 111-$m$), and output second driving signals. A plurality of first amplifiers (122-1 to 122-$n$) included in the second driver/receiver 120 are connected to a plurality of second touch electrodes (121-1 to 121-$n$), and output third driving signals.

FIG. 7 shows detailed operations of first and second drivers/receivers 110 and 120 in a second sub-section T22 of a second period T2 of FIG. 4.

Referring to FIG. 7, for the second sub-section T22, a plurality of differential amplifiers (or difference amplifiers) (113-1 to 113-$i$) included in the first driver/receiver 110 and a plurality of differential amplifiers (or difference amplifiers) (123-1 to 123-$j$) included in the second driver/receiver 120 are respectively connected to two touch electrodes that are separated from each other. The respective differential amplifiers (113-1 to 113-$i$ and 123-1 to 123-$j$) may differentially amplify two detection signals transmitted from the corresponding touch electrodes and may output resultant signals. The respective differential amplifiers (113-1 to 113-$i$ and 123-1 to 123-$j$) receive a detection signal from two touch electrodes and differentially amplify the same, so when the driving signal is simultaneously applied to a plurality of touch electrodes, it is not saturated.

The respective differential amplifiers (113-1 to 113-$i$ and 123-1 to 123-$j$) may receive a detection signal not from two adjacent touch electrodes, but from two touch electrodes that are separated from each other. For example, the respective differential amplifiers (113-1 to 113-$i$ and 123-1 to 123-$j$) may receive a detection signal from two touch electrodes that are separated from each other with at least one touch electrode therebetween.

For example, with reference to FIG. 7, the differential amplifier 113-1 receives detection signals from the touch electrode 111-1 and the touch electrode 111-5. When the differential amplifier 113-1 receives a detection signal from the two adjacent touch electrodes (e.g., a first touch electrode 111-1 and a first touch electrode 111-2), the detection signals caused by the touch in the area between the first touch electrode 111-1 and the first touch electrode 111-2 do not, even when they are differentially amplified by the differential amplifier 113-1, have a sufficiently large value. Therefore, when the differential amplifier 113-1 is connected to two adjacent touch electrodes, touch sensitivity is deteriorated. However, the differential amplifier 113-1 receives detection signals from the first touch electrode 111-1 and the first touch electrode 111-5, so the detection signal caused by the touch electrode of the position to which the touch is input so that it may have a sufficiently large value, and the touch sensitivity may be improved.

For the second sub-section T22, the ADCs 115 and 125 of the first driver/receiver 110 and the second driver/receiver 120 convert the differentially amplified detection signals into digital signals. The signal processors 117 and 127 process a plurality of differentially amplified signals that are converted into digital signals and transmit resultant signals to the controller 130.

A plurality of differential amplifiers (113-1 to 113-$i$ and 123-1 to 123-$j$) may be configured by changing a connection of input ends of a plurality of amplifiers (123-1 to 123-$n$). That is, it is given that i+j=n. In detail, two touch electrodes may be connected to one amplifier by connecting an input end connected to a ground or a DC voltage from among two input ends of the amplifier 123-1 to the corresponding second touch electrode 121-4, and connecting an input end connected to the ground or the DC voltage from among the two input ends of the amplifier 123-1 to the corresponding second touch electrode 121-5.

A method for detecting a touch described with reference to FIG. 3 will now be described in detail with reference to FIG. 8 to FIG. 12.

Figure 8:
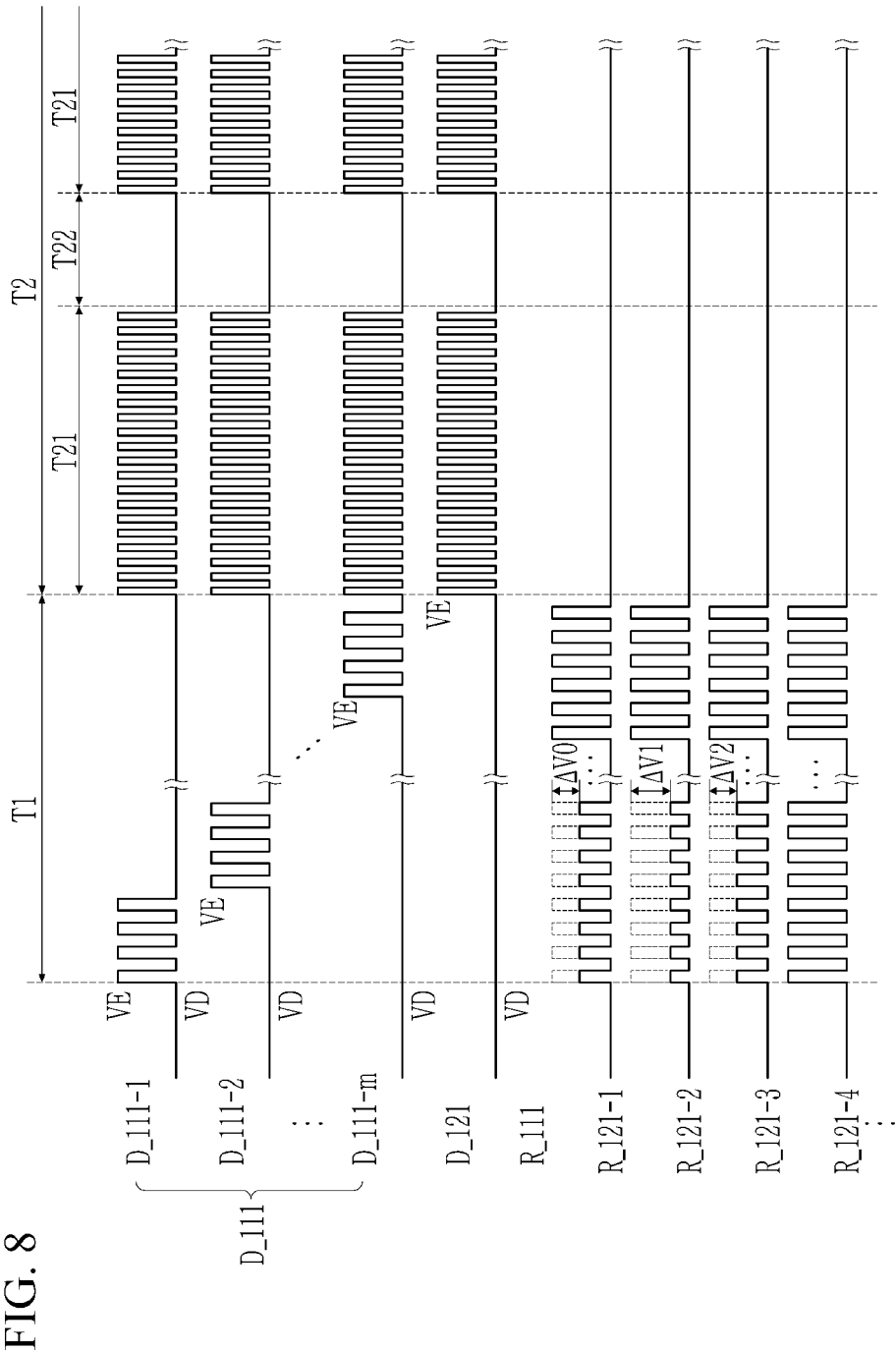
FIG. 8 shows a waveform diagram of an example of a driving signal and a received signal according to a method for detecting a touch described with reference to FIG. 3.
Figure 9:
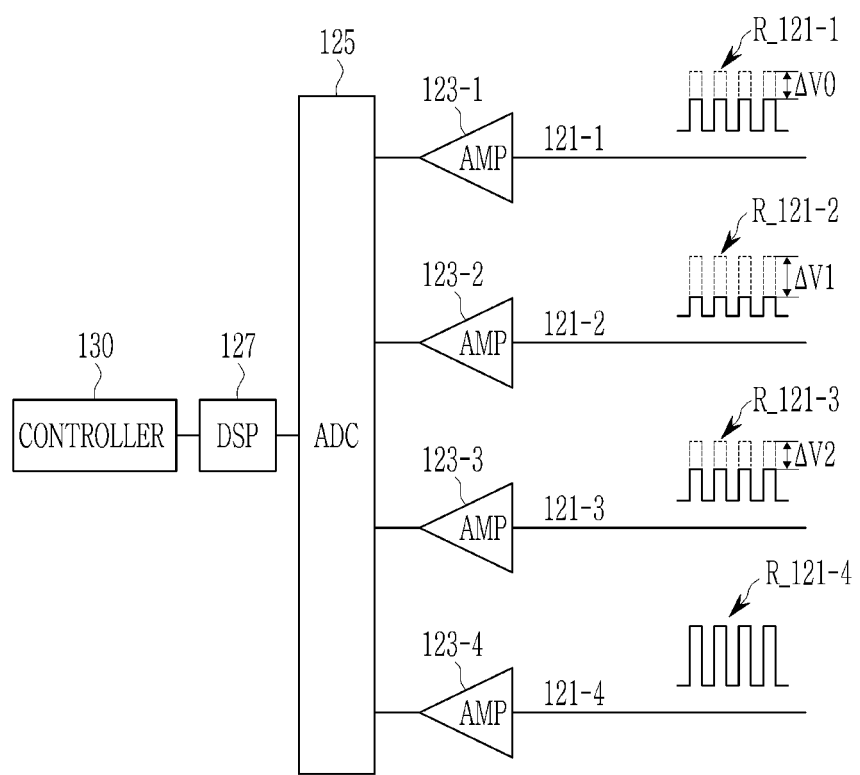
FIG. 9 shows an example for processing a detection signal in a first period of FIG. 8.

FIG. 8 shows a waveform diagram of an example of a driving signal and a received signal according to a method for detecting a touch described with reference to FIG. 3, and FIG. 9 shows an example for processing a detection signal in a first period T1 of FIG. 8. It is assumed in FIG. 8 and FIG. 9 that there is a touch generated by a finger in an area where the first touch electrodes (111-1 and 111-2) cross the second touch electrodes (121-1, 121-2, and 121-3).

Referring to FIG. 8, for the first period T1, first driving signals (D_111-1 to D_111-$m$) are sequentially applied to a plurality of first touch electrodes (111-1 to 111-$m$). The first driving signals (D_111-1 to D_111-$m$) represent pulse signals having an enable-level voltage (VE) and a disable-level voltage (VD).

The second driver/receiver 120 receives detection signals (R_121-1 to R_121-$n$) from a plurality of second touch electrodes (121-1 to 121-$n$).

The first driving signals (D_111-1 to D_111-$m$) represent driving signals for detecting a touch input by a touch object other than the stylus pen 20, and they are not limited by the waveform shown in FIG. 8. The first driving signals (D_111-1 to D_111-$m$) are illustrated to be sequentially applied to a plurality of first touch electrodes (111-1 to 111-$m$) in FIG. 8, and driving signals having different frequencies (e.g., frequencies with an orthogonal relationship) may be simultaneously applied to a plurality of first touch electrodes (111-1 to 111-$m$). In this case, the second driver/receiver 120 may receive detection signals caused by a touch from a plurality of second touch electrodes (121-1 to 121-$n$), and may separate the detection signals for respective first touch electrodes (111-1 to 111-*m*) by using band pass filters with different frequency bandwidths.

As shown in FIG. 9, for the first period T1, the detection signal (R_121-1) from the second touch electrode 121-1 is amplified through the corresponding amplifier 123-1 and a resultant signal is output, the detection signal (R_121-2) from the second touch electrode 121-2 is amplified through the amplifier 123-1 and a resultant signal is output, the detection signal (R_121-3) from the second touch electrode 121-3 is amplified through the amplifier 123-1 and a resultant signal is output, and the detection signal (R_121-4) from the second touch electrode 121-4 is amplified through the amplifier 123-1 and a resultant signal is output. Changes of the signal size by the touch are generated as ΔV0, ΔV1, and ΔV2 to the detection signals (R_121-1, R_121-2, and R_121-3).

The controller 130 may calculate a point where the first touch electrodes 111-1 and 111-2 to which a driving signal when the signal size changes is applied cross the second touch electrodes 121-1, 121-2, and 121-3 at which the signal size is changed as touch coordinates.

Referring to FIG. 8, for the first sub-section T21 of the second period T2, second driving signals (D_111-1 to D_111-*m*) are applied to a plurality of first touch electrodes (111-1 to 111-*m*), and a third driving signal D_121 is applied to a plurality of second touch electrodes (121-1 to 121-*n*). The second and third driving signals (D_111 and D_121) represent pulse signals having an enable-level voltage (VE) and a disable-level voltage (VD) and having a similar frequency to the resonant frequency of the stylus pen 20.

In the first sub-section T21, no detection signal is received from a plurality of first touch electrodes (111-1 to 111-*m*) and a plurality of second touch electrodes (121-1 to 121-*n*).

In the second sub-section T22, the first driver/receiver 110 and the second driver/receiver 120 may receive detection signals from a plurality of first touch electrodes (111-1 to 111-*m*) and a plurality of second touch electrodes (121-1 to 121-*n*).

The second period T2 includes a plurality of first sub-sections T21 and second sub-sections T22. For example, for the second period T2, a combination of the first sub-section T21 and the second sub-section T22 may be repeated eight times.

No touch by the stylus pen 20 is generated in FIG. 8, so no detection signal is received for the second sub-section T22.

Figure 10:
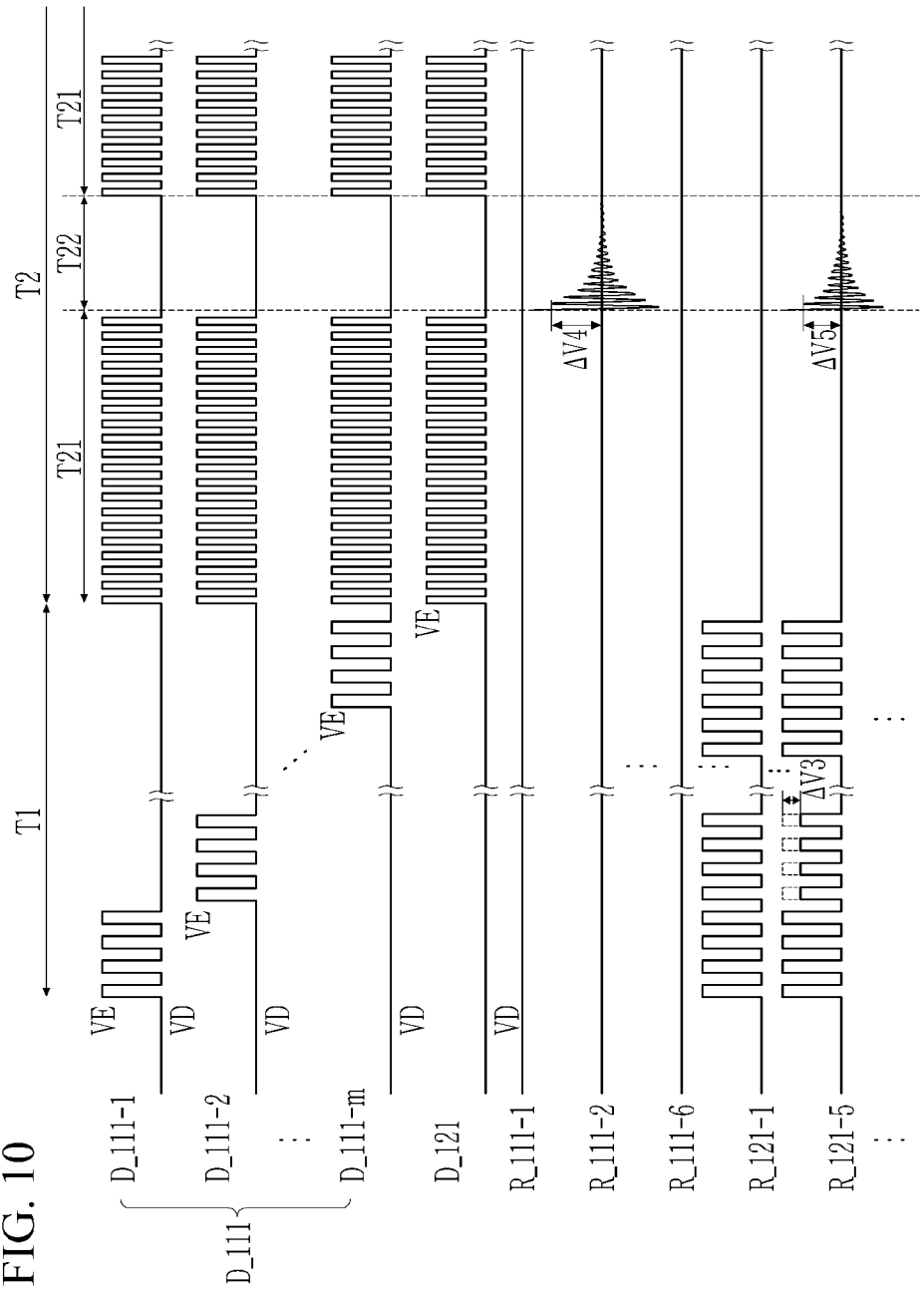
FIG. 10 shows a waveform diagram of another example of a driving signal and a received signal according to a method for detecting a touch described with reference to FIG. 3.
Figure 11:
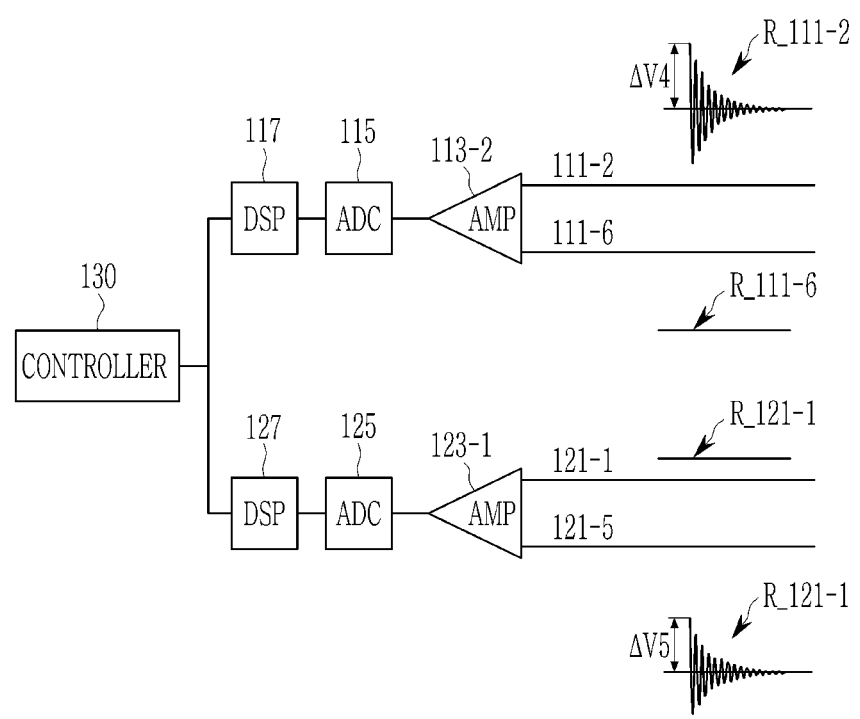
FIG. 11 shows an example of processing a detection signal in a second period of FIG. 10.

FIG. 10 shows a waveform diagram of another example of a driving signal and a received signal according to a method for detecting a touch described with reference to FIG. 3, and FIG. 11 shows an example for processing a detection signal in a second period T2 of 10. It is assumed in FIG. 10 and FIG. 11 that a touch caused by the stylus pen 20 is generated in the area where the first touch electrode 111-2 crosses the second touch electrode 121-5.

Referring to FIG. 10, for the first period T1, first driving signals (D_111-1 to D_111-*m*) are sequentially applied to a plurality of first touch electrodes (111-1 to 111-*m*). The second driver/receiver 120 receives detection signals (R_121-1 to R_121-*n*) from a plurality of second touch electrodes (121-1 to 121-*n*).

The stylus pen 20 is provided near the second touch electrode 121-5, so a signal size changing value ΔV3 of the detection signal (R_121-5) from the second touch electrode 121-5 to which the touch is generated may be amplified through the amplifier 123-5, and a resultant signal may be output.

For the first sub-section T21 of the second period T2, second driving signals (D_111-1 to D_111-*m*) are applied to a plurality of first touch electrodes (111-1 to 111-*m*), and a third driving signal D_121 is applied to a plurality of second touch electrodes (121-1 to 121-*n*). The second and third driving signals (D_111 and D_121) represent pulse signals having an enable-level voltage (VE) and a disable-level voltage (VD) and having a similar frequency to the resonant frequency of the stylus pen 20.

The enable-level voltage (VE) and the disable-level voltage (VD) of the second and third driving signals (D_111 and D_121) are illustrated to be identical in-phase signals in FIG. 10, and the present invention is not limited thereto. In the first sub-section T21, the size of the pen resonant signal increases according to the time for applying the second and third driving signals (D_111 and D_121). The size of the pen resonant signal is saturated after a predetermine time passes.

In the first sub-section T21, no detection signal is received from a plurality of first touch electrodes (111-1 to 111-*m*) and a plurality of second touch electrodes (121-1 to 121-*n*).

When the first sub-section T21 ends, the first driver/receiver 110 stops applying the driving signal D_111 and the second driver/receiver 120 stops applying the driving signal D_121. For the second sub-section T22 of the second period T2, no driving signals (D_111 and D_121) are applied to a plurality of first touch electrodes (111-1 to 111-*m*) and a plurality of second touch electrodes (121-1 to 121-*n*).

For the second sub-section T22, the first driver/receiver 110 and the second driver/receiver 120 may receive detection signals from a plurality of first touch electrodes (111-1 to 111-*m*) and a plurality of second touch electrodes (121-1 to 121-*n*). The first driver/receiver 110 and the second driver/receiver 120 may receive the pen resonant signal for the second sub-section T22 in which no driving signals (D_111 and D_121) are applied, as a detection signal.

As shown in FIG. 11, a signal size difference ΔV4 between the detection signal (R_111-2) from the first touch electrode 111-2 where a touch is provided and the detection signal (R_111-6) from the first touch electrode 111-6 where no touch is provided may be amplified through the differential amplifier 113-2, and a resultant signal may be output. In a like manner, a signal size difference ΔV5 between the detection signal (R_121-5) from the second touch electrode 121-5 where a touch is provided and the detection signal (R_121-1) from the second touch electrode 121-1 where no touch is provided may be amplified through the differential amplifier 123-1, and a resultant signal may be output.

The controller 130 may calculate a point where the first touch electrodes (111-1 and 111-2) to which a driving signal is applied when a signal size difference is generated crosses the second touch electrodes (121-2, 121-3) where a signal size difference is generated, as touch coordinates.

The controller 130 may calculate a touch position on the touch panel 100 through the detection signal received from the second sub-section T22. According to the touch device 10 according to an exemplary embodiment, for the second sub-section T22, the detection signals are received through a plurality of first touch electrodes (111-1 to 111-*m*) and a plurality of second touch electrodes (121-1 to 121-*n*), so the touch coordinates according to two axes crossing each other may be obtained within a short time.

Further, for the first period T1, the size of the resonant signal of the stylus pen 20 is improved by simultaneously applying the same driving signals (D_111 and D_121) to a plurality of first touch electrodes (111-1 to 111-*m*) and a plurality of second touch electrodes (121-1 to 121-*n*).

In the above-provided description, the detection signal may be received at least once for the second sub-section T22 by at least one of the first driver/receiver 110 and the second driver/receiver 120. Further, the time for receiving a detection signal may be at least one time in the second sub-section T22, and it is not limited thereto.

The sizes of the detection signals received for the first period T1 and the second period T2 will now be described with reference to FIG. 12.

Figure 12:
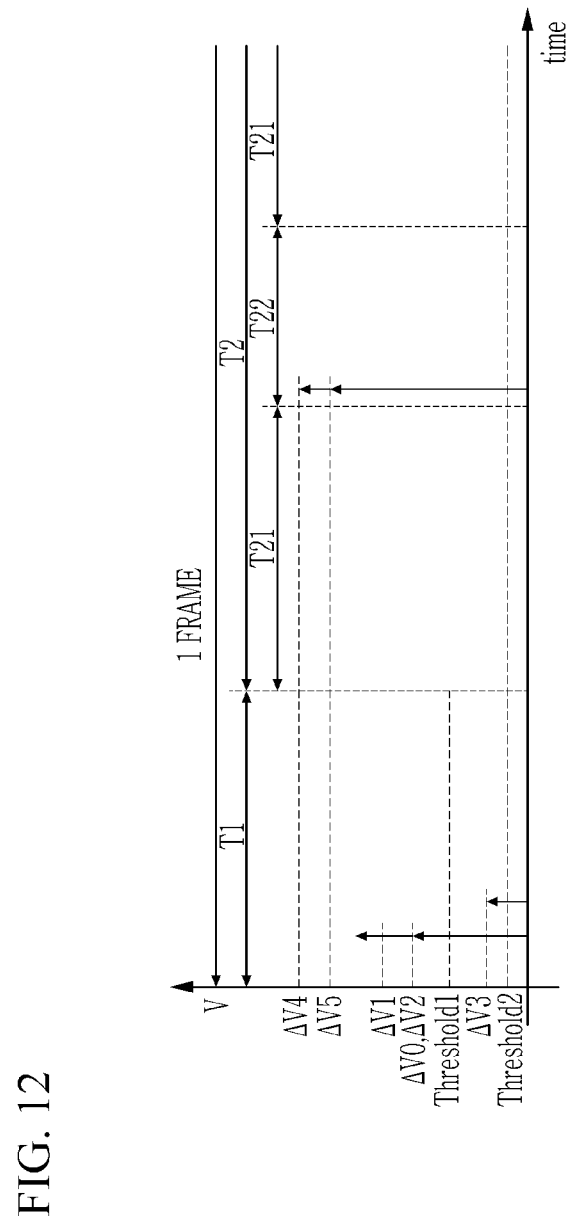
FIG. 12 shows a graph indicating intensity of a received signal in FIG. 8 and FIG. 10.

FIG. 12 shows a graph indicating a size of a received signal in FIG. 8 and FIG. 10. One frame (1 FRAME) includes a first period T1 and a second period T2. The second period T2 includes a first sub-section T21 and a second sub-section T22. When the second period T2 ends, the first period T1 of the next frame starts.

For the first period T1, the size differences of the detection signals caused by the finger are ΔV1 and ΔV2, which are greater than a first threshold value (Threshold1). For the first period T1, the size difference of the detection signal by the stylus pen 20 is ΔV3, which is equal to or less than the first threshold value (Threshold1).

According to an exemplary embodiment, the controller 130 determines the detection signal that has the size difference that is greater than the first threshold value (Threshold1) for the first period T1 to be a valid touch signal. The first threshold value (Threshold1) may be set so that the first detection signal caused by body regions (a finger, a palm, etc.) of the user may be determined to be a valid touch signal and the second detection signal caused by the stylus pen 20, which is a passive stylus pen, may be filtered.

Therefore, the controller 130 determines the detection signal caused by the finger to be a valid touch signal, and calculates touch coordinates by using the detection signal. The controller 130 determines the detection signal caused by the stylus pen 20 to not be a valid touch signal, and does not calculate the touch coordinates.

For the second period T2, the size differences of the detection signals by the stylus pen 20 are ΔV4 and ΔV5, which are greater than a second threshold value (Threshold2).

The controller 130 determines the detection signal that has the size difference that is greater than the second threshold value (Threshold2) for the second period T2 to be a valid touch signal. Therefore, the controller 130 determines the detection signal caused by the stylus pen 20 to be a valid touch signal, and calculates the touch coordinates by using the detection signal.

According to exemplary embodiments, the first threshold value (Threshold1) is set so that the first detection signal caused by the body regions (a finger, a palm, etc.) of the user may be determined to be a valid touch signal, and the second detection signal by the stylus pen 20 that is a passive stylus pen may be filtered. Accordingly, the touch coordinates caused by the touch object with a big change of signal size may be accurately detected for the first period T1, and the touch coordinates caused by the touch object with a small change of signal size may be accurately detected for the second period T2.

A touch area according to a touch object will now be described with reference to FIG. 13 and FIG. 14.

Figure 13:
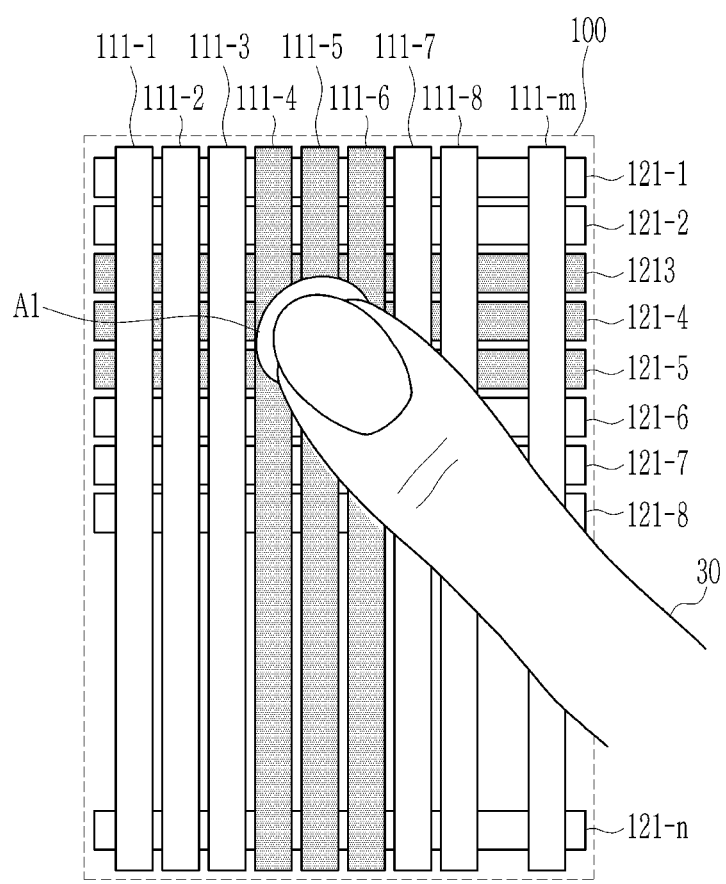
FIG. 13 and FIG. 14 respectively show touch areas of different objects.
Figure 14:
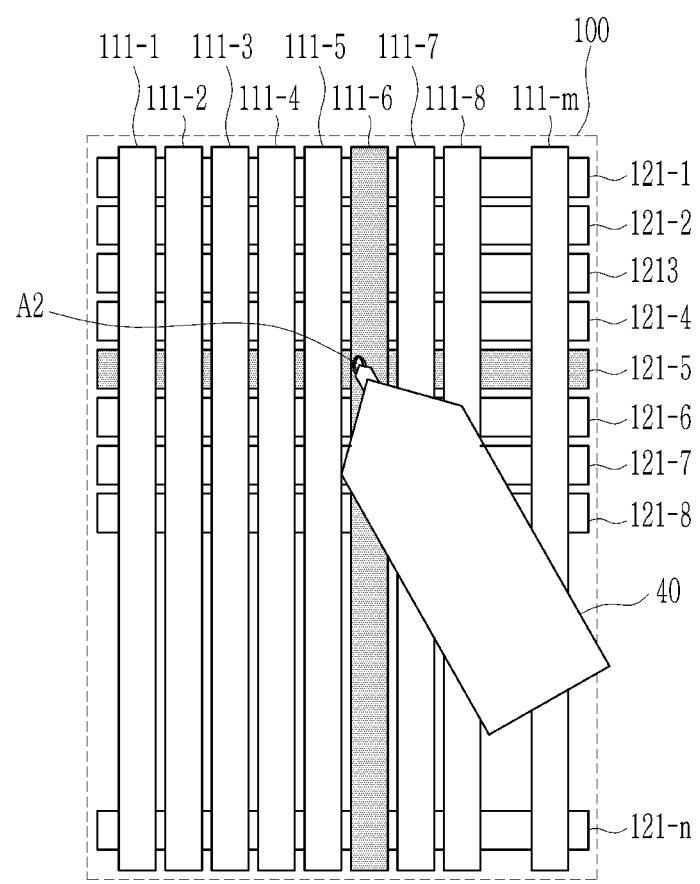

FIG. 13 and FIG. 14 respectively show touch areas of different objects.

FIG. 13 shows a case in which a finger 30 touches a touch panel 100.

Referring to FIG. 13, a plurality of touch electrodes (111-3 to 111-5 and 121-4 to 121-6) may be disposed near an area A1 where an end of the finger 30 contacts the touch panel 100. In this case, the controller 130 may calculate the area of the touch area A1 by using the detection signal received from the sensing channels corresponding to a plurality of touch electrodes (111-3 to 111-5 and 121-4 to 121-6).

FIG. 14 shows a case in which a stylus pen 40 touches a touch panel 100.

Referring to FIG. 14, one first touch electrode 111-6 and one second touch electrode 121-6 may be provided near the area A2 in which a tip of the stylus pen 40 contacts the touch panel 100. In another way, two first touch electrodes and two second touch electrodes may be provided near the area A2 in which the tip of the stylus pen 40 contacts the touch panel 100. That is, a number of the touch electrodes provided in the area A1 in which the end of the finger 30 contacts the touch panel 100 is less than a number of the touch electrodes provided in the area A2 in which the tip of the stylus pen 40 contacts the touch panel 100. Therefore, the area of the touch area A2 caused by a touch of the stylus pen 40 is calculated to be a very small value compared to the touch area A1 caused by the touch of the finger 30.

According to exemplary embodiments, the touch device 10 may transmit touch data including information on the area of the touch area to a host device. By this, the host device may identify whether the touch object is a finger 30 or a stylus pen 40.

According to exemplary embodiments, the touch device 10 may determine the touch object according to the calculated area of the touch area, and may transmit touch data including information on the determined touch object to the host device.

Touch data will now be described with reference to FIG. 15 and FIG. 16.

Figure 15:
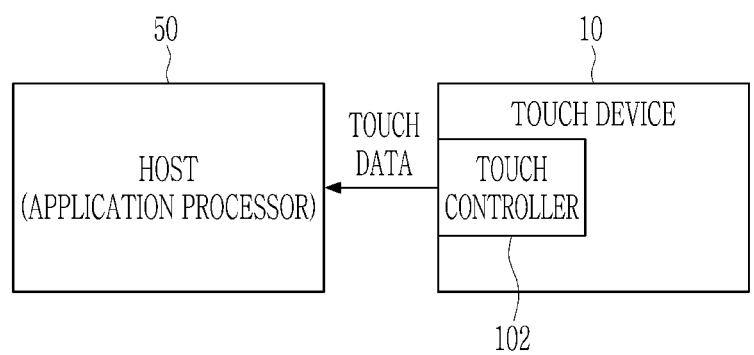
FIG. 15 shows a block diagram of a touch device and a host according to an exemplary embodiment.
Figure 16:
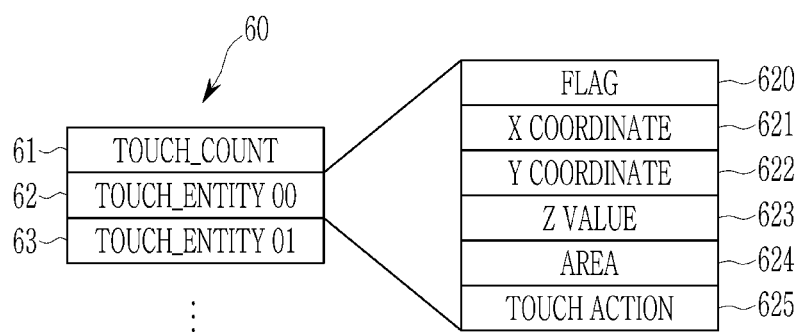
FIG. 16 shows an example of touch data provided to a host from a touch device.

FIG. 15 shows a block diagram of a touch device and a host according to an exemplary embodiment, and FIG. 16 shows an example of touch data provided to a host from a touch device.

Referring to FIG. 15, the host 50 may receive touch data from the touch controller 102 included in the touch device 10. For example, the host 50 may be a mobile system-on-chip (SoC), an application processor (AP), a media processor, a microprocessor, a central processing unit (CPU), or a device that is similar to them.

The touch device 10 may, after one frame ends, generate information on the touch that is input for one frame as touch data, and may transmit the same to the host 50.

In another way, when the first period T1 ends, the touch device 10 may generate information on the touch that is input for the first period T1 as touch data and may transmit the same to the host 50, and when the first sub-section T21 following the first period T1 ends, the touch device 10 may generate information on the touch that is input for the first sub-section T21 as touch data and may transmit the same to the host 50.

Referring to FIG. 16, the touch data 60 may include a touch count field 61 and at least one of touch entity fields 62 and 63.

A value for indicating the number of touches that are input for one frame period may be written in the touch count field 61. For example, when the touch coordinates caused by one finger are calculated for the first period T1 of one frame period, and the touch coordinates caused by one stylus pen are calculated for the first sub-section T21, a value for indicating that two touches are input is written in the touch count field 61.

The touch entity fields 62 and 63 include fields for indicating information on the respective touch inputs. For example, the touch entity fields 62 and 63 include a flag field 620, an X-axis coordinate field 621, a Y-axis coordinate field 622, a Z-value field 623, an area field 624, and a touch action field 625.

The number of the touch entity fields 62 and 63 may correspond to the value written in the touch count field 61.

A value for indicating the touch object may be written in the flag field 620. For example, the finger, the palm, and the stylus pen may be written as different values in the flag field 620. Values for indicating the calculated touch coordinates may be written in the X-axis coordinate field 621 and the Y-axis coordinate field 622. A value corresponding to signal intensity of the detection signal may be written in the Z-value field 623. A value corresponding to the area of the touched area may be written in the area field 624.

According to exemplary embodiments, the host 50 having received the touch data 60 uses the value of the area field 624 to determine that the touch object is the finger 30 when the touch area is greater than a threshold value, and to determine that the touch object is a stylus pen 20 when the touch area is equal to or less than the threshold value.

According to exemplary embodiments, the host 50 having received the touch data 60 uses the value of the flag field 620 to identify whether the touch object is a finger 30 or a stylus pen 20.

In prior art, when the stylus pen 20 contacts the touch panel 100 together with other conductive touch objects such as a hand, the touch device 10 may fail to sense the touch of the stylus pen 20 depending on the position of the touch object or the touch pattern (areas, shapes, etc.).

A phenomenon of failing to sense a touch of a stylus pen 20 because of another conductive touch object will now be described with reference to FIG. 17 and FIG. 18.

Figure 17:
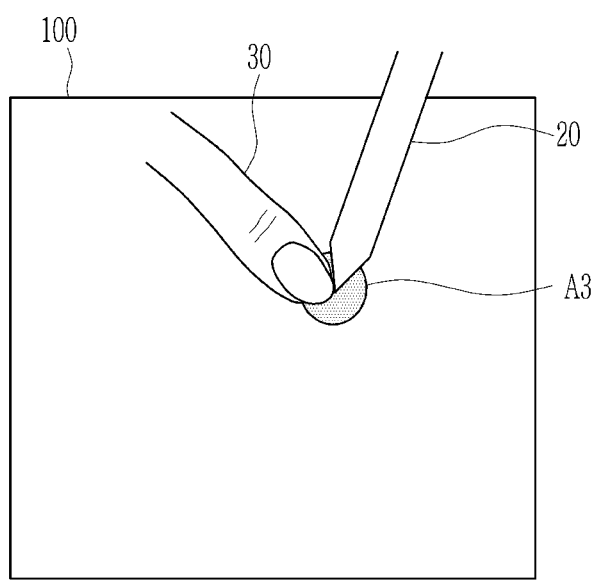
FIG. 17 shows a case in which a touch of a stylus pen is not sensed according to a distance between a stylus pen and a touch point of another touch object.

FIG. 17 shows a case in which a touch of a stylus pen 20 is not sensed according to a distance between a stylus pen 20 and a touch point of another touch object 30. FIG. 18 shows a case in which a touch of a stylus pen 20 is not sensed according to a touch area of another touch object 30.

As shown in FIG. 17, when the touch point of another touch object 30 is positioned in an area A3 that is disposed away from the touch point of the stylus pen 20 within a predetermined distance, the size of the detection signals caused by the touch of the stylus pen 20, received by the driver/receivers 110 and 120, is reduced for the second period T2. For example, the size of the detection signal in this case may be reduced by about 30%, compared to the case in which the stylus pen 20 touches the touch panel 100.

Figure 18:
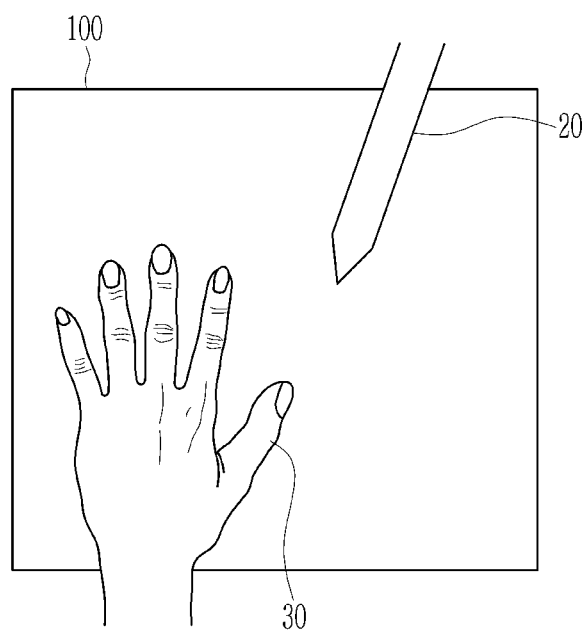
FIG. 18 shows a case in which a touch of a stylus pen is not sensed according to a touch area of another touch object.

As shown in FIG. 18, when the touch area of another touch object 30 is large in a like manner of the case in which the user touches the touch panel 100 by the palm, the size of the detection signals caused by the touch of the stylus pen 20 received by the drivers/receivers 110 and 120 is reduced for the second period T2. For example, the size of the detection signal in this case may be reduced to be substantially about 40%, compared to the case in which the stylus pen 20 touches the touch panel 100.

The signal size of the touch detection signal of the stylus pen 20 is reduced by an influence of the other touch object 30 as described above, so when the size of the detection signal is lower than the second threshold value, the touch device 10 may fail to sense the touch of the stylus pen 20 even though the stylus pen 20 touches the touch panel 100. When the second threshold value is reduced to be a minimum value so as to solve the above-noted problem, the touch device 10 may sense a touch of the stylus pen 20 even though the stylus pen 20 does not touch the touch panel 100 but hovers, so writing quality using the stylus pen may be degraded.

Therefore, to solve the problem according to exemplary embodiments to be described, the range of the signal size of the detection signal identified as a valid touch signal for the second period T2 may be differently determined, regarding the case in which the stylus pen 20 and a conductive touch object 30 (e.g., a hand, a finger, etc.) that is different from the stylus pen 20 concurrently touch the touch panel 100 and the case in which the stylus pen 20 touches the touch panel 100. That is, the touch device 10 identifies the detection signal having the signal size in a first range as a valid touch signal when identifying the valid touch signal from among the detection signals received through the controller 130 for the second period T2 while the stylus pen 20 touches the touch panel 100, and it may identify the detection signal having the signal size in a second range as a valid touch signal when the conductive touch object 30 and the stylus pen 20 concurrently touch the touch panel 100. Here, the second range indicates a signal size range having a lowest value that is different from the first range, and the lowest value of the signal size of the first range may be greater than the lowest value of the signal size of the second range. Therefore, the touch device 10 may identify the detection signal having a signal size that is lower than the detection signal identified as a valid touch signal, as a valid touch signal while the stylus pen 20 touches the touch panel 100 when the stylus pen 20 and the conductive touch object 30 concurrently touch the touch panel 100.

According to an exemplary embodiment (refer to a method for determining a valid touch signal described with reference to FIG. 19), the touch device 10 may vary the range of the signal size of the detection signal identified as a valid touch signal for the second period T2 by differently using the second threshold value that is a reference for determining the valid touch signal for the second period T2, regarding the case in which the stylus pen 20 and the conductive touch object 30 concurrently touch the touch panel 100 and the case in which the stylus pen 20 touches the touch panel 100. In this instance, the touch device 10 determines the second threshold value that is a reference for determining a valid touch signal for the second period T2 based on the detection signal received for the first period T1, so the range of the signal size of the detection signal determined to be a valid touch signal can be different, regarding the case in which a plurality of touch objects including the stylus pen 20 concurrently touch the touch panel 100 and the case in which the stylus pen 20 touches the touch panel 100.

Further, according to another exemplary embodiment (refer to a method for determining a valid touch signal described with reference to FIG. 20), the touch device 10 may vary the range of the signal size of the detection signal determined to be a valid touch signal, regarding the case in which a plurality of touch objects including the stylus pen 20 concurrently touch the touch panel 100 and the case in which the stylus pen 20 touches the touch panel 100 by amplifying the detection signal received for the second period T2 at a predetermined ratio and comparing the resultant signal with the second threshold value when a plurality of touch objects including the stylus pen 20 concurrently touch the touch panel 100. In this instance, when the stylus pen 20 touches the touch panel 100, and the detection signal received for the second period T2 is amplified before comparison with the second threshold value, an amplification ratio in the case in which a plurality of touch objects including the stylus pen 20 concurrently touch the touch panel 100 may be set to be greater than an amplification ratio in the case in which the stylus pen 20 touches the touch panel 100.

Exemplary embodiments for determining a valid touch signal in a stage S14 of the method for detecting a touch described with reference to FIG. 3 will now be described with reference to FIG. 19 and FIG. 20.

Figure 19:
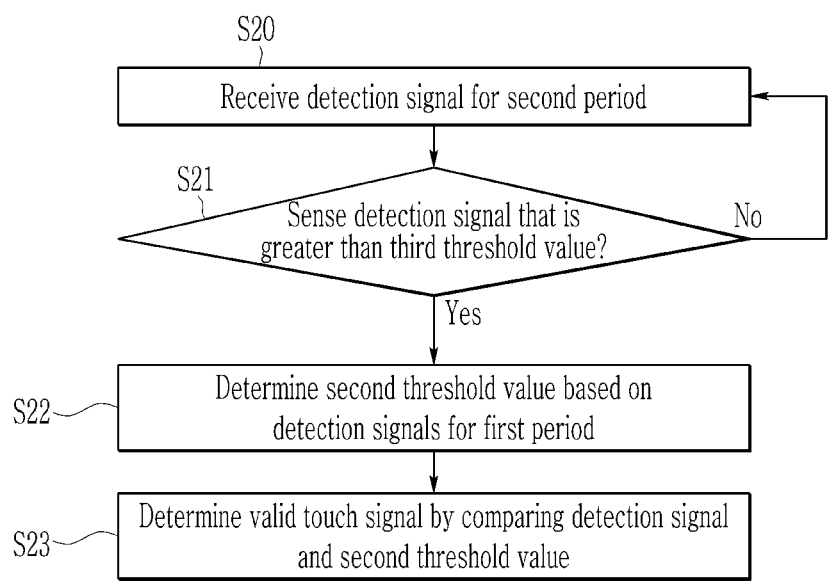
FIG. 19 shows a flowchart for determining a valid touch signal in a stage of S14 of a method for detecting a touch described with reference to FIG. 3 according to an exemplary embodiment.

FIG. 19 shows a flowchart for determining a valid touch signal in a stage of S14 of a method for detecting a touch described with reference to FIG. 3 according to an exemplary embodiment.

Referring to FIG. 19, the controller 130 of the touch device 10 receives a detection signal through a plurality of touch electrodes (111-3 to 111-5 or 121-4 to 121-6) for the second period T2 in which the touch device 10 is driven in the second mode (refer to S13 of FIG. 3) (S20), and it compares the same with a third threshold value to determine whether there is a detection signal that is greater than the third threshold value (S21).

The third threshold value is set to be a value that is less than the second threshold value, and it is used to filter noise from the detection signal and determine whether a touch caused by the stylus pen 20 is generated. That is, the controller 130 may determine as that the touch of the stylus pen 20 is generated when a detection signal that is greater than the third threshold value from among the detection signals transmitted from a plurality of touch electrodes (111-3 to 111-5 or 121-4 to 121-6) for the second period T2 is detected.

In the stage S21, when a detection signal that is greater than the third threshold value is detected, the controller 130 determines that a touch caused by the stylus pen 20 is generated. For the first period T1 shown in FIG. 3, the second threshold value is determined based on the detection signals transmitted from the plurality of touch electrodes (121-1 to 121-n) through the sensing channels (S22).

Equation 1 shows determination of a second threshold value (Tr).

$$Tr = Tp \times f(Sa, Sb), 0 < f(Sa, Sb) \leq 1 \quad \text{[Equation 1]}$$

In Equation 1, Tp represents a default value of a second threshold value, that is, a second threshold value that is before it is corrected by using the detection signals for the first period T1. Also, Sa represents detection signals that are sensed in a predetermined area that is near the touch point of the stylus pen 20 for the first period T1, and Sb represents detection signals that are sensed from the touch panel 100 for the first period T1. Further, f(Sa, Sb) represents a function for calculating a weight value based on attributes (a signal size, coordinates, etc.) of the corresponding detection signals (Sa and Sb).

In Equation 1, Sa represents detection signals corresponding to a predetermined area that is provided near the touch point of the stylus pen 20 from among the detection signals that are received from a plurality of second touch electrodes (121-1 to 121-n) through sensing channels for the first period T1 in which the touch device 10 is driven in the first mode (refer to the stage S10 of FIG. 3). The predetermined area may be a circular or polygonal area with respect to the touch point, and it may have a predetermined area, for example, the area of 1 cm² or 2 cm². Shapes and areas of the predetermined area are not limited thereto.

Here, the touch point (or the coordinates) of the stylus pen 20 that is the reference for selecting Sa is information that is different from the touch coordinates obtained by using a valid touch signal in the stage S15 of FIG. 3, and it may be obtained corresponding to the detection signal having a maximum value from among the detection signals received through the stage S20. When the touch point (or the coordinates) of the stylus pen 20 is determined as described above, the controller 130 may select a sensing channel (or a touch electrode) corresponding to the same and a plurality of sensing channels (or touch electrodes) neighboring each other with respect to the sensing channel, and may select detection signals received from the selected sensing channels as Sa. Here, the number of sensing channels for obtaining Sa is set corresponding to the range in which the touch point of the touch object 30 influences the detection signal caused by the touch of the stylus pen 20, and it may be set to be different depending on the touch device 10. For example, the controller 130 may select five sensing channels (or touch electrodes) that are respectively adjacent to each other in the X-axis and Y-axis directions with respect to the touch point (or the coordinates) of the stylus pen 20, and may obtain Sa from them.

In Equation 1, f(Sa) may be a function for calculating a weight value based on the signal sizes of the selected detection signals (Sa). That is, f(Sa) may be a function for calculating a relatively large value (e.g., a value that is near 1) when a sum (or an average) of the signal sizes of the selected detection signals (Sa) is small, and calculating a relatively small value (e.g., a value that is near 0) when the sum (or the average) of the signal sizes of the selected detection signals (Sa) is large. In this case, the weight value calculated by f(Sa) may have a small value in the case in which the touch area caused by the other touch object 30 is large on the position that is near the touch point of the stylus pen 20 or the case in which the size of the detection signal substantially changes (e.g., the touch signal is mostly synced by the touch object 30), compared to other cases.

Further, f(Sa) may be a function for calculating a weight value based on a distance (a minimum distance or an average distance) between the sensing channel of the detection signal having a signal size that is equal to or greater than a predetermined value from among the selected detection signals (Sa) and the touch point of the stylus pen 20. That is, f(Sa) may be a function for calculating a relatively large value (e.g., a value that is near 1) as a weight value when the distance (the minimum distance or the average distance) between the sensing channel of the detection signal having the signal size that is equal to or greater than a predetermined value from among the selected detection signals (Sa) and the touch point of the stylus pen 20 is long, and calculating a relatively small value (e.g., a value that is near 0) as a weight value when the distance (the minimum distance or the average distance) between the sensing channel of the detection signal having the signal size that is equal to or greater than a predetermined value from among the selected detection signals (Sa) and the touch point of the stylus pen 20 is short. Therefore, the weight value calculated by f(Sa) may have a smaller value as the touch point of the stylus pen 20 approaches the touch position of another touch object 30.

In Equation 1, Sb represents all detection signals received from a plurality of second touch electrodes (121-1 to 121-n) through sensing channels for the first period T1 in which the touch device 10 is driven in the first mode (refer to the stage S10 of FIG. 3).

In Equation 1, f(Sb) may be a function for calculating a weight value based on the touch area (or the number of touch electrodes touched by the touch object 30) of the touch object 30. For the first period T1, as the touch area (or the number of the touch electrodes touched by the touch object 30) caused by the touch object 30 increases, the sum (or the average) of the signal sizes of the detection signals (Sb) increases. Based on the above-noted characteristic, f(Sb) may be set so as to calculate a relatively large value (e.g., a value that is near 1) as a weight value when the sum (or the average) of the signal sizes of Sbs is small, and calculate a relatively small value (e.g., a value that is near 0) as a weight value when the sum (or the average) of the signal sizes of Sbs is large. In this case, the weight value calculated by f(Sb) may have a smaller value as the area (or the number of the touch electrodes touched by the touch object 30) touched by the touch object 30 increases.

For example, f(Sb) may be a function for calculating different weight values according to touch shapes of the touch object 30. In this case, f(Sb) may be a function for estimating a touch shape according to a distribution pattern of signal sizes of detection signals (Sb), and calculating a corresponding weight value.

On the other hand, the case in which the weight value calculated by f(Sa, Sb) is set to be modified in response to the distance between the touch point of the stylus pen 20 and the touch point of the touch object 30, or the touch pattern (a touch area or a touch shape) of the touch object 30 has been exemplified, and the weight value calculated by the f(Sa, Sb) may be changed in response to various touch properties. For example, f(Sa, Sb) may be a function for calculating different weight values according to a position relationship between the touch point of another touch object 30 and the touch point of the stylus pen 20 (e.g., a distance between the touch point of another touch object 30 and the touch point of the stylus pen 20, a number of sensing channels provided between the touch point of another touch object 30 and the touch point of the stylus pen 20, a state for indicating whether the touch point of another touch object 30 and the touch point of the stylus pen 20 are positioned in a same sensing channel, and a state for indicating whether the touch point of the touch object 30 and the touch point of the stylus pen 20 are positioned in a diagonal sensing channel).

Further, f(Sa, Sb) expressed in Equation 1 may be a random function for outputting a value that is greater than a and less than 1 by using each detection signal (Sa or Sb). The weight value calculating function f(Sa) may be a random function, that is, a function expressed as an algebraic function, a transcendental function, or a combination thereof, for using a variable corresponding to properties (a position, a signal size, etc.) of the detection signal (Sa), and setting a second threshold value (Tr) to be a value that is equal to or less than a default value (Tp). For example, f(Sa) may include a function for outputting a value that is near 1 as the distance between the position of the detection signal (Sa) and the touch point (or the coordinates) of the stylus pen 20 increases, outputting a value that is near 0 as the distance between the position of the detection signal (Sa) and the touch point (or the coordinates) of the stylus pen 20 reduces, outputting a value that is near 0 as the intensity (e.g., a voltage value, a capacitance variance, etc.) of the detection signal (Sa) increases, and outputting a value that is near 1 as the intensity of the detection signal (Sa) reduces.

In a like manner, f(Sb) may be a random function, that is, a function expressed as an algebraic function, a transcendental function, or a combination thereof, for using a variable corresponding to properties (an area, a signal size, etc.) of the detection signal (Sb), and setting the second threshold value (Tr) to be a value that is equal to or less than a default value (Tp). For example, f(Sb) may include a function for outputting a value that is near 1 as the area of the detection signal (Sb) reduces, outputting a value that is near 0 as the area of the detection signal (Sb) increases, outputting a value that is near 0 as the intensity (e.g., a voltage value, a capacitance variance, etc.) of the detection signal (Sb) increases, and outputting a value that is near 1 as the intensity of the detection signal (Sa) reduces.

In Equation 1, the weight value output by f(Sa, Sb) has a value that is greater than 0 and equal to or less than 1, and it may have a value that is greater than the above-noted third threshold value. Therefore, the second threshold value (Tr) may be controlled to be a value that is equal to or less than the default value (Tp) of the second threshold value by the weight value calculating functions f(Sa, Sb). For example, when no touch by another touch object 30 is generated, the weight values calculated by f(Sa, Sb) have the value of 1, and the corresponding second threshold value (Tr) may be the default value (Tp) of the second threshold value. Further, for example, when a touch of another touch object 30 is generated at a point that is near the touch point of the stylus pen 20, f(Sa, Sb) has the value that is less than 1, and the second threshold value (Tr) may be a value that is less than the default value (Tp) of the second threshold value. Further, for example, when the touch area of another touch object 30 is large, f(Sa, Sb) has the value that is less than 1, and the second threshold value (Tr) may be a value that is less than the default value (Tp) of the second threshold value.

As described above, when a touch of another touch object 30 is generated on the point that is near the touch point of the stylus pen 20, or when a touch with a large area is generated by another touch object 30, the second threshold value is determined to be a value that is lower than the default value. Therefore, when the signal size of the detection signal caused by the touch of the stylus pen 20 is reduced by the touch of another touch object 30, it is possible to detect a valid touch signal corresponding to the stylus pen 20.

The controller 130, when the second threshold value is determined by the stage S22, compares the same with the detection signal received for the second period T2 to determine a valid touch signal for the second period T2 (S23).

It has been described in the above that when the detection signal that is greater than the third threshold value is detected in the stage S21 (i.e., when the touch caused by the stylus pen 20 is generated), the second threshold value is determined according to the detection signals for the first period T1, and the present invention is not limited thereto.

For example, the controller 130 may determine the second threshold value by using Equation 1 irrespective of whether the detection signals received for the second period T2 are greater than the third threshold value.

For example, the controller 130 may determine the second threshold value by using Equation 1 when the detection signals received for the first period T1 are determined to be signals caused by the touch of the touch object for the touch panel 100 (i.e., when a touch caused not by the stylus pen 20 but by another touch object is generated). In this case, the controller 130 may determine that a touch on the touch panel 100 is generated by the touch object when a detection signal that is greater than a fourth threshold value (a threshold value that is equal to or less than the first threshold value of FIG. 3) is detected from among the detection signals received for the first period T1.

For example, the controller 130 may determine the second threshold value by using Equation 1 when the detection signals received for the second period T2 is greater than the third threshold value, and the detection signals received for the first period T1 are determined to be signals caused by the touch of the touch object (i.e., when the touch caused by the stylus pen 20 and the touch caused by the touch object are simultaneously generated).

In another way, the second threshold value may be set to be a default value (Tp) in other cases excluding the case in which the second threshold value is determined through Equation 1.

Figure 20:
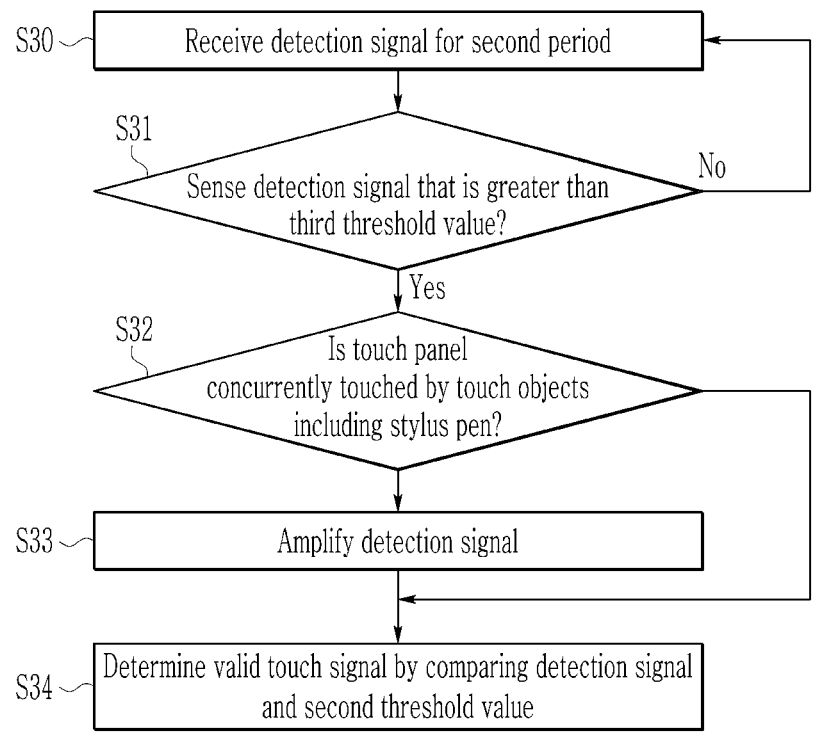
FIG. 20 shows a flowchart of determining a valid touch signal in a stage of S14 of a method for detecting a touch described with reference to FIG. 3 according to another exemplary embodiment.

FIG. 20 shows a flowchart of determining a valid touch signal in a stage of S14 of a method for detecting a touch described with reference to FIG. 3 according to another exemplary embodiment.

Referring to FIG. 20, the controller 130 of the touch device 10 receives detection signals from a plurality of touch electrodes (111-3 to 111-5 or 121-4 to 121-6) for the second period T2 (refer to S13 of FIG. 3) in which the touch device 10 is driven in the second mode (S30), compares the same with a third threshold value, and determines whether there is a detection signal that is greater than the third threshold value (S31).

The third threshold value is set to be a value that is less than a second threshold value to be described, and is used to filter noise from the detection signal, and to determine whether a touch caused by the stylus pen 20 is generated. That is, the controller 130, when a detection signal that is greater than a third threshold value is detected from among the detection signals transmitted from a plurality of touch electrodes (111-3 to 111-5 or 121-4 to 121-6) for the second period T2, may determine that the touch of the stylus pen 20 is generated.

As described above, when the touch is determined to be generated by the stylus pen 20, the controller 130 identifies whether the touch panel 100 is concurrently touched by a plurality of touch objects including the stylus pen 20 (S32).

In the stage S32, the controller 130 may identify a concurrent touching state based on the detection signals transmitted from a plurality of touch electrodes (121-1 to 121-n) through sensing channels for the first period T1 of FIG. 3. For example, as it is already determined that the touch is generated by the stylus pen 20 through the stage S31, the controller 130 may detect the concurrent touching state by checking whether the valid touch signal is detected for the first period T1.

The controller 130, when the touch panel 100 is identified to be concurrently touched by a plurality of touch objects including the stylus pen 20 in the stage S32, the detection signal received from a plurality of touch electrodes (111-3 to 111-5 or 121-4 to 121-6) in the stage S30 is amplified with a predetermined ratio (S33). The amplified detection signal is compared with the second threshold value to determine a valid touch signal for the second period T2 (S34).

In the stage S33, the amplification ratio may be changed according to a touch position (a relative position with the stylus pen 20) and a touch pattern (areas, shapes, etc.) of the touch objects excluding the stylus pen 20 from among the concurrently touched touch objects.

The controller 130, when the touch caused by the stylus pen 20 is identified to be generated in the stage S32, the detection signals received through the stage S30 are compared with the second threshold value without amplification to determine the valid touch signal for the second period T2 (S34). Accordingly, when the touch panel 100 is concurrently touched by a plurality of touch objects including the stylus pen 20, the detection signal with a small signal size may be determined to be a valid touch signal compared to the case in which the touch panel 100 is touched only by the stylus pen 20. Therefore, when the signal size of the detection signal caused by the touch of the stylus pen 20 is reduced by the touch of another touch object 30 while the stylus pen 20 and the other touch objects 30 are concurrently touched, it is possible to detect a valid touch signal corresponding to the stylus pen 20.

It has been described in FIG. 20 that the detection signal is amplified when the concurrent touch is identified through the stage S32, but the present invention is not limited thereto, and the detection signal may be amplified when the touch panel 100 is touched in a single manner by the stylus pen 20. In this case, the amplification ratio in the case in which a plurality of touch objects including the stylus pen 20 concurrently touch the touch panel 100 may be set to be greater than the amplification ratio in the case in which only the stylus pen 20 touches the touch panel 100.

According to the above-described exemplary embodiments, when the conductive object such as a human body and the stylus pen simultaneously contact it, performance for detecting touch data by the stylus pen may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A touch device comprising:
   a touch panel including a plurality of touch electrodes;
   a driver/receiver for applying a first driving signal to the touch panel while driven in a first mode, and applying a second driving signal that is different from the first driving signal to the touch panel while driven in a second mode; and
   a controller for comparing first detection signals received from the touch panel with a first threshold value to obtain first touch data while driven in the first mode, and comparing second detection signals received from the touch panel with a second threshold value to obtaining second touch data while driven in the second mode,
   wherein the controller determines the second threshold value based on at least part of the first detection signals.

2. The touch device of claim 1, wherein
   the controller obtains touch coordinates by using the second detection signals, and determines the second threshold value by using first detection signals corresponding to a predetermined area selected based on the touch coordinates from among the first detection signals.

3. The touch device of claim 1, wherein
   the plurality of touch electrodes include a plurality of first touch electrodes arranged in a first direction and a plurality of second touch electrodes arranged in a second direction crossing the first direction, and
   the driver/receiver applies a signal at a first frequency as the first driving signal to the first touch electrodes during a first period driven in the first mode.

4. The touch device of claim 3, wherein
   the driver/receiver applies a signal at a second frequency that is different from the first frequency as the second driving signal to the first touch electrodes and the second touch electrodes during a part of a second period driven in the second mode.

5. The touch device of claim 4, wherein
   the controller receives the second detection signals from the first touch electrodes and the second touch electrodes during a part of the second period.

6. The touch device of claim 3, wherein
the controller receives the first detection signals from the second touch electrodes for the first period.

7. The touch device of claim 1, wherein
a frequency of the second driving signal corresponds to a resonant frequency of a stylus pen.

8. The touch device of claim 1, wherein
the first detection signals are used in obtaining touch coordinates of a first touch object, while the second detection signals are used in obtaining touch coordinates of a second touch object, and
the second touch object includes a stylus pen, and the first touch object includes a conductive touch object that is different from the stylus pen.

9. The touch device of claim 8, wherein
the controller, when the first and second touch objects simultaneously touch the touch panel, obtains the second touch data caused by the second touch object by changing the second threshold value according to a distance between a touch point of the first touch object and a touch point of the second touch object.

10. The touch device of claim 8, wherein
the controller, when the first and second touch objects simultaneously touch the touch panel, obtains the second touch data caused by the second touch object by changing the second threshold value according to a touch pattern of the first touch object.

11. The touch device of claim 10, wherein
the touch pattern includes a touch area or a touch shape.

12. A touch device comprising:
a touch panel;
a driver/receiver for applying a driving signal corresponding to a frequency of a resonant signal of a stylus pen to a touch panel, and receiving detection signals from the touch panel; and
a controller for obtaining touch data caused by the stylus pen by using at least one detection signal identified as a valid touch signal from among the detection signals,
wherein the controller identifies a detection signal having a signal size in a first range as the valid touch signal when the touch panel is touched by the stylus pen alone, and
wherein the controller identifies a detection signal having a signal size in a second range that is different from the first range as the valid touch signal when the touch panel is concurrently touched by the stylus pen and a conductive touch object that is different from the stylus pen.

13. The touch device of claim 12, wherein
the controller identifies the valid touch signal by comparing the detection signals and a threshold value, and
the threshold value when the touch panel is touched by the stylus pen alone is different from the threshold value when the touch panel is concurrently touched by the stylus pen and a conductive touch object that is different from the stylus pen.

14. The touch device of claim 12, wherein,
when the touch panel is concurrently touched by the stylus pen and a conductive touch object that is different from the stylus pen, the controller amplifies detection signals having a signal size in the second range so that they have a signal size in the first range, and then identifies the valid touch signal by comparing the amplified detection signals and a threshold value.

15. A method for a touch device to detect a touch, comprising:
applying a driving signal corresponding to a resonant signal of a stylus pen to the touch panel when a touch panel is touched by the stylus pen;
receiving detection signals from the touch panel;
identifying a valid touch signal from among the detection signals by using a threshold value; and
obtaining touch data caused by the stylus pen by using the detection signal identified as the valid touch signal from among the detection signals,
wherein the identifying includes
identifying a detection signal having a signal size in a first range from among the detection signals as the valid touch signal when the touch panel is touched by the stylus pen alone, and
identify a detection signal having a signal size in a second range that is different from the first range from among the detection signals as the valid touch signal when the touch panel is concurrently touched by the stylus pen and a conductive touch object that is different from the stylus pen.

16. The method of claim 15, wherein
the threshold value when the touch panel is touched by the stylus pen alone is different from the threshold value when the touch panel is concurrently touched by the stylus pen and a conductive touch object that is different from the stylus pen.

17. The method of claim 15, wherein
the identifying of a detection signal having a signal size in the second range as the valid touch signal includes:
amplifying the detection signals so that the detection signal having a signal size in the second range from among the detection signals may have a signal size in the first range; and
identifying the valid touch signal by comparing the amplified detection signals and the threshold value.

18. A method for a touch device to detect a touch, comprising:
entering a first mode, and applying a first driving signal to a touch panel;
receiving first detection signals from the touch panel corresponding to the first driving signal;
obtaining first touch data by comparing the first detection signals and a first threshold value;
entering a second mode, and applying a second driving signal that is different from the first driving signal to the touch panel;
receiving second detection signals from the touch panel corresponding to the second driving signal;
determining a second threshold value based on the first detection signals; and
obtaining second touch data by comparing the second detection signals and the second threshold value.

19. The method of claim 18, wherein
the determining includes:
obtaining touch coordinates by using the second detection signals; and
determining the second threshold value by using first detection signals corresponding to a predetermined area selected based on the touch coordinates from among the first detection signals.

20. The method of claim 18, wherein
the determining includes using one of a first value and a second value obtained by using the first detection signals as the second threshold value.

21. The method of claim 20, wherein
the second value is less than the first value.

22. The method of claim 18, further comprising:
obtaining touch coordinates of a first touch object by using the first touch data; and
obtaining touch coordinates of a second touch object by using the second touch data,
wherein the second touch object includes a stylus pen, and the first touch object includes a conductive touch object that is different from the stylus pen.

23. The method of claim 18, wherein
the determining includes
changing the second threshold value according to a distance between a touch point of the first touch object and a touch point of the second touch object when the first and second touch objects simultaneously touch the touch panel.

24. The method of claim 18, wherein
the determining includes
changing the second threshold value according to a touch pattern of the first touch object when the first and second touch objects simultaneously touch the touch panel.

* * * * *